United States Patent [19]

Masuda et al.

[11] Patent Number: 5,293,283

[45] Date of Patent: Mar. 8, 1994

[54] TAPE GUIDING ASSEMBLY FOR RECORDING AND/OR REPRODUCING APPARATUS EMPLOYING ULTRASONICALLY VIBRATED TAPE GUIDES

[75] Inventors: Shigeru Masuda; Hiroshi Kiriyama; Osamu Shimizu; Kazunari Tanimura, all of Kanagawa, Japan

[73] Assignee: Sony Corporation, Tokyo, Japan

[21] Appl. No.: 865,174

[22] Filed: Apr. 8, 1992

[30] Foreign Application Priority Data

Apr. 12, 1991 [JP] Japan .................. 3-106581

[51] Int. Cl.$^5$ ........................................... G11B 15/665
[52] U.S. Cl. ................................. 360/85; 360/95; 360/130.23
[58] Field of Search .............. 360/85, 130.2, 130.22, 360/130.21, 130.23, 84, 95

[56] References Cited

U.S. PATENT DOCUMENTS

| 4,567,535 | 1/1986 | Kinjo ..................... | 360/87 |
|---|---|---|---|
| 4,620,245 | 10/1986 | Shimizu ................. | 360/85 |
| 4,903,149 | 2/1990 | Hasegawa et al. ..... | 360/69 |
| 4,961,120 | 10/1990 | Mototake et al. ..... | 360/85 |
| 4,991,039 | 2/1991 | Kaku .................... | 360/85 |
| 5,053,900 | 10/1991 | Hasegawa et al. ..... | 360/85 |
| 5,224,643 | 7/1993 | Kojima et al. ......... | 360/95 |

FOREIGN PATENT DOCUMENTS

| 0100284 | 2/1984 | European Pat. Off. . | |
|---|---|---|---|
| 61-175960 | 8/1986 | Japan ................ | 360/130.21 |
| 61-237252 | 10/1986 | Japan ................ | 360/130.21 |
| 62-117161 | 5/1987 | Japan ................ | 360/130.21 |
| 2-78046 | 3/1990 | Japan ................ | 360/130.21 |
| 2-199656 | 8/1990 | Japan ................ | 360/130.21 |
| 2-232851 | 9/1990 | Japan ................ | 360/130.21 |
| 2239457 | 9/1990 | Japan ................ | 360/130.21 |
| 595787 | 6/1978 | U.S.S.R. ............ | 360/130.21 |

*Primary Examiner*—Stuart S. Levy
*Assistant Examiner*—Kevin M. Watkins
*Attorney, Agent, or Firm*—William S. Frommer; Alvin Sinderbrand

[57] ABSTRACT

In a tape recording and/or reproducing apparatus having a guide drum with rotary heads for recording or reproducing signals in slant tracks scanned on a longitudinally transported tape wrapped helically about a circumferential surface of the drum between a tape-entry position and a tape-exit position; a tape-guiding assembly, which may be part of a tape loading device, includes ultrasonically vibrated tape guides engageably by the tape adjacent the tape-entry and tape-exit positions, respectively, auxiliary guide elements angled relative to the vibrated tape guides, respectively, and each being disposed for engagement by the tape between the respective vibrated tape guide and the tape-entry or tape exit position, respectively, with such auxiliary guide elements having respective surface projections extending therefrom at positions therealong corresponding to widthwise portions of the tape at which the rotary heads scan the tape adjacent the tape-entry and tape-exit positions, respectively, so that the surface projections on the auxiliary guide elements relatively increase tension in the tape at the respective widthwise portions for minimizing errors that may arise in the signals recorded or reproduced in the tracks adjacent the tape-entry and tape-exit positions due to vibrations transmitted along the tape from the vibrated tape guides.

30 Claims, 14 Drawing Sheets

TAPE GUIDING ASSEMBLY FOR RECORDING AND/OR REPRODUCING APPARATUS EMPLOYING ULTRASONICALLY VIBRATED TAPE GUIDES

BACKGROUND OF THE INVENTION

This invention relates generally to a tape guiding assembly for a recording and/or reproducing apparatus, such as, a video tape recorder (VTR), and more particularly is directed to a tape guiding assembly, as aforesaid, which is included in a tape loading device by which tape is withdrawn from a cassette and wrapped helically about a circumferential surface of a guide drum provided with rotary heads for recording or reproducing signals in slant tracks scanned on the tape wrapped about the drum between a tape-entry position and a tape-exit position.

It has been proposed to provide a tape guiding assembly for a VTR which includes ultrasonically vibrated tape guides engageable by the tape adjacent the tape-entry and tape-exit positions, respectively, and auxiliary guide elements angled relative to the vibrated tape guides, respectively, and each being disposed for engagement by the tape between the respective vibrated tape guide and the tape-entry or tape-exit position, respectively. When such tape guiding assembly is included in a tape loading and unloading apparatus, the vibrated tape guides and the respective auxiliary guide elements are mounted on respective sliders which are movable between unloaded positions, in which the vibrated tape guides and auxiliary guide elements are engageable with the tape in a cassette, and loaded positions, in which the vibrated tape guides and respective auxiliary guide elements are disposed adjacent the tape-entry and tape-exit positions, respectively. When the sliders are moved from their unloaded positions to the respective loaded positions, the vibrated tape guides and auxiliary guide elements withdraw the tape from the cassette and wrap the tape about the circumferential surface of the guide drum between the tape-entry and tape-exit positions. When the vibrated tape guides are operated, ultrasonic vibrations are generated to reduce the frictional resistance to movement of the tape. Generally, the ultrasonically vibrated tape guides vibrate at frequencies between about 100 and 150 kHz with an amplitude of about 1 μm.

In existing tape guiding assemblies employing ultrasonically vibrated tape guides, as aforesaid, the vibrations generated thereby are propagated past the adjacent relatively angled auxiliary guide elements to at least those portions of the tape wrapped about the guide drum which are adjacent the tape-entry and tape-exit positions. In the case of digital VTRs, the foregoing vibrations cause the error rate of the digital video signal to deteriorate to within a range of from $1 \times 10^{-5}$ to $3 \times 10^{-4}$ during recording or reproducing operations.

By reason of such deterioration of the error rate of the video signal during recording or reproducing operations, it is a disadvantage of existing tape guiding assemblies including ultrasonically vibrated tape guides that the latter are usually energized or operated only in the fast-forward or rewind mode. In other words, the ultrasonically vibrated tape guides are usually not vibrated in the recording or reproducing mode so that the reduction in the frictional resistance to movement of the tape is not then realized.

Further, in the known tape guiding assembly included in a tape loading and unloading apparatus, there is the danger that the tape, tape guides and the like will be damaged if the tape tension becomes excessive, for example, when the tape reaches one of the ends thereof in either the fast-forward mode or rewind mode without a sufficient deceleration theretofore.

Moreover, in previously proposed tape guiding assemblies included in tape loading and unloading apparatus and employing ultrasonically vibrated tape guides, the latter are mounted on respective sliders which, at the loaded positions, are located by respective stoppers disposed thereat. Contacts provided on each slider and on the respective stopper are mutually engaged with each other when the slider attains the loaded position so that power for energizing the respective vibrated tape guide can be supplied through the mutually engaged contacts. However, such contacts are engaged and disengaged at each loading and unloading operation and are either subject to relatively rapid wear or corrosion, or to the accumulation of foreign matter therebetween by which undesirably increased contact resistance and the unreliable transmission of power is experienced.

It is also to be noted that, in a previously proposed tape guiding assembly employing ultrasonically vibrated tape guides, each of the latter comprises a support shaft, a cylindrical metal bushing, usually of brass, slidable on the support shaft and having a plurality of annular bearing projections as integral parts of the bushing and being spaced apart in the axial direction on the outer surface of the bushing, a tubular tape guide, for example, of a ceramic, diametrically dimensioned to extend telescopically over the bushing and be supported, at the inner surface of the tubular tape guide, by the annular projections on the bushing, and an ultrasonic vibration generator fixed to the tubular tape guide at a side of the latter and being operative to generate an ultrasonic standing wave oscillation in the tubular tape guide with nodes thereof substantially at the annular projections. However, if the annular projections are not precisely located at vibration nodes, the tubular tape guide will move at its areas of contact with the annular projections and, by reason of the relatively hard material of such annular projections, will generate undesirable noise.

OBJECTS AND SUMMARY OF THE INVENTION

Accordingly, it is generally an object of this invention to provide a tape guiding assembly, for example, as part of a tape loading and unloading apparatus, which employs ultrasonically vibrated tape guides, and which avoids the above described problems and disadvantages of the prior art.

More specifically, it is an object of this invention to provide a tape guiding assembly employing ultrasonically vibrated tape guides, and in which propagation of vibrations along the tape to either the tape-entry position or tape-exit position on the surface of a rotary head drum is substantially prevented so as to avoid deterioration of the error rate.

In accordance with an aspect of this invention, in a tape recording and/or reproducing apparatus having a guide drum with rotary heads for recording or reproducing signals in slant tracks scanned on a longitudinally transported tape wrapped helically about a circumferential surface of the drum between a tape-entry position and a tape-exit position; a tape guiding assembly, which may be part of a tape loading device, includes ultrasonically vibrated tape guides engageable by the tape adjacent the tape-entry and tape-exit positions, respectively, auxiliary guide elements angled relative to the vibrated tape guides, respectively, and each being disposed for engagement by the tape between the respective vibrated tape guide and the tape-entry or tape-exit position, respectively, with such auxiliary guide elements having respective surface projections extending therefrom at positions therealong corresponding to widthwise portions of the tape at which the rotary heads scan the tape adjacent the tape-entry and tape-exit positions, respectively, so that the surface projections on the auxiliary guide elements relatively increase tension in the tape at the respective widthwise portions for minimizing errors that may arise in the signals recorded or reproduced in the tracks adjacent the tape-entry and tape-exit positions due to vibrations propagated along the tape from the vibrated tape guides.

It is another specific object of this invention to provide a tape recording and/or reproducing apparatus with a tape loading device which includes ultrasonically vibrated tape guides mounted on respective sliders moveable from unloaded to loaded positions at which contacts on the sliders and on stoppers provided for locating the sliders in their loaded positions are engaged with each other for supplying energizing power to the vibrated tape guides, and in which excessive wear or corrosion of the contacts is avoided.

In accordance with another aspect of this invention, in a tape recording and/or reproducing apparatus, a tape loading device comprises an ultrasonically vibrated tape guide, a slider having the vibrated tape guide mounted thereon, a guide rail having a surface on which the slider is moveable from an unloaded position to a loaded position at which the vibrated tape guide operatively positions a tape engaged therewith, a stopper fixed at the loaded position for determining the position of the slider thereat, contacts on an end surface of the slider which faces toward the stopper in moving toward the loaded position and on a surface of the stopper which confronts the end surface of the slider as the latter moves toward the loaded position, such contacts being mutually engageable in the loaded position of the slider for supplying energizing power to the vibrated tape guide thereon, the end surface of the slider and the surface of the stopper which confronts the same being inclined upwardly and forwardly, in the direction of movement of the slider to its loaded positions, from a perpendicular to the surface of the guide rail so that, in a final increment of movement of the slider to its loaded position, the end surface of the slider is urged away from the surface of the guide rail to provide a wiping action between the mutually engageable contacts.

Still another specific object of this invention is to provide a tape guiding assembly particularly suited for use in a tape loading and unloading device of a VTR, and in which the occurrence of excessive tensions in the tape, for example, as when the tape runs out while running at a high speed in either the fast-forward or rewind mode, is avoided.

In accordance with still another aspect of this invention, in a tape recording and/or reproducing apparatus having a guide drum with rotary heads for recording or reproducing video signals in slant tracks scanned on a longitudinally transported tape wrapped helically about a portion of circumferential surface of the drum, and a fixed head for recording or reproducing signals, such as, audio signals, in a track extending longitudinally on the tape; a tape loading apparatus comprises: main loading means operative for withdrawing a tape from a cassette and wrapping the withdrawn tape about the guide drum; and auxiliary loading means including an auxiliary loading guide element mounted on one end of a support arm which is pivotally supported adjacent its other end for angular movements between an unloaded position in which the auxiliary loading guide element is engageable with the tape in the cassette and a loaded position in which the auxiliary loading guide element also withdraws tape from the cassette and forms, in the withdrawn tape, a bight directed laterally away from the guide drum between the cassette and the guide drum with the tape in such bight engaging the fixed head, a driving arm having a connection with the main loading means to be driven thereby, a pair of pivotally connected links extending between the driving and support arms and being relatively angularly moveable between an extended condition and a contracted condition, and a limiter spring urging the links to the extended condition for moving the support arm to its loaded position when the main loading means is operative, while the links are moved to the contracted condition against the force of the limiter spring when the tape tension in the mentioned bight exceeds a predetermined value, whereupon, the support arm can move substantially toward its unloaded position for relieving the excess tension in the tape.

It is a further object of this invention to provide an ultrasonically vibrated tape guide as aforesaid, which is substantially noise-free in operation.

A still further object of this invention is to provide an ultrasonically vibrated tape guide, as aforesaid, which can be relatively simply disassembled and reassembled, as when replacement of parts therein is required.

In accordance with a further aspect of this invention, an ultrasonic tape guide comprises a support shaft, a cylindrical bushing slideable on the support shaft and having a plurality of bearing rings spaced apart in the axial direction on the outer surface of the bushing, with at least the bearing rings being of a shock-absorbing material, for example, a polycarbonate resin, a tubular tape guide diametrically dimensioned to extend telescopically over the bushing and be supported, at the inner surface of the tubular tape guide, by the bearing rings, and an ultrasonic vibration generator fixed to the tubular tape guide at a side of the latter and being operative to generate an ultrasonic standing wave oscillation in the tubular tape guide with nodes thereof substantially at the bearing rings.

In a preferred embodiment of this invention, the support shaft of the ultrasonic tape guiding apparatus extends upwardly from a base and has a threaded upper end portion, upper and lower flanges extend around the support shaft at opposite ends of the bushing and project beyond the outer surface of the tubular tape guide, a spring is provided about the support shaft between the base and the lower flange, and a nut is engaged with the threaded upper end portion of the support shaft and is adjustable along the latter for displacing the flanges, bushing and tubular tape guide, as a unit, along the support shaft against the yieldable resistance of the spring.

The above, and other objects, features and advantages of this invention, will be apparent in the following detailed description of illustrative embodiments thereof when read in connection with the accompanying drawings in which corresponding parts are identified by the same reference numerals in the several views of the drawings.

DETAILED DESCRIPTION OF THE PREFERRED EMBODIMENTS

Figure 1:
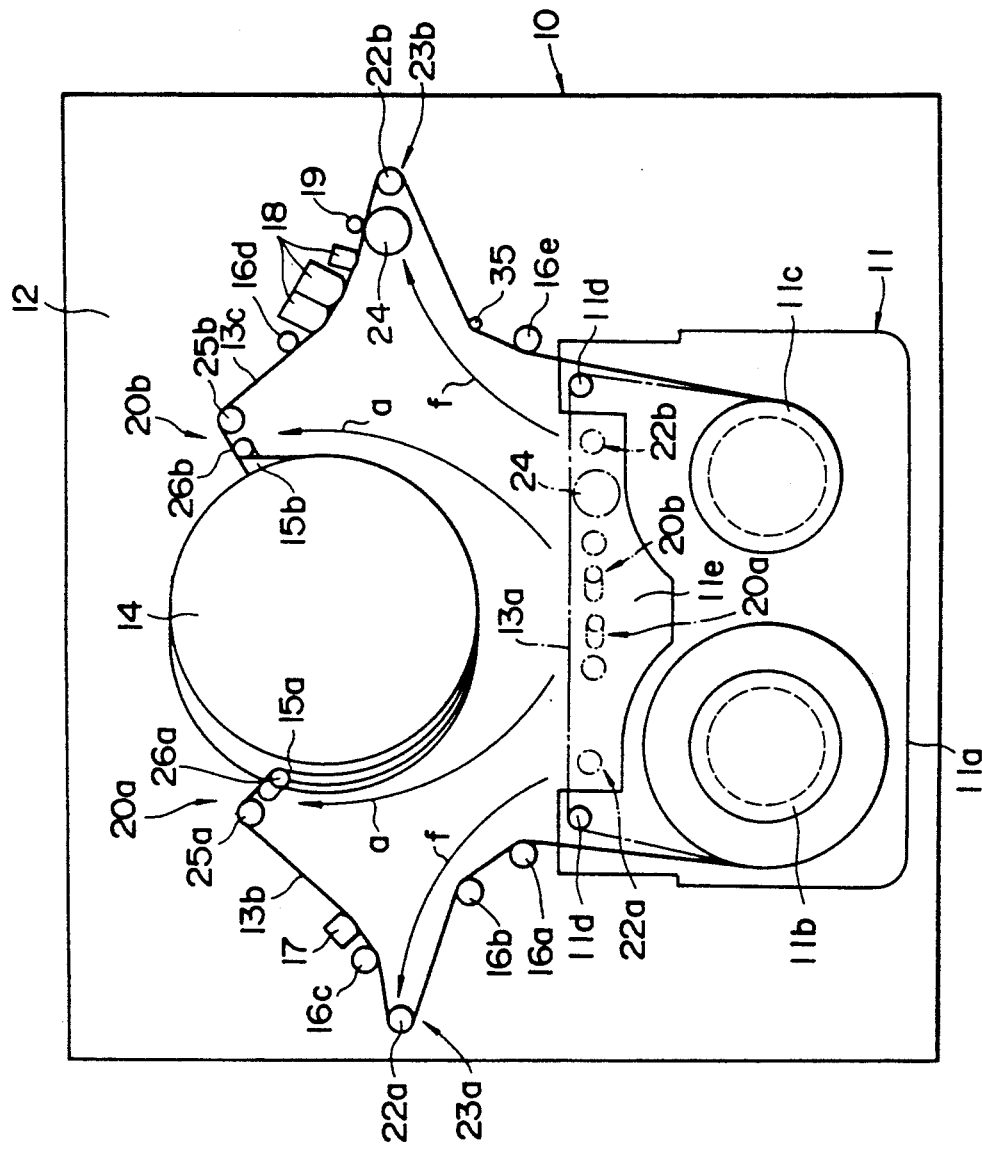
FIG. 1 is a schematic plan view showing a video tape recorder (VTR) having a tape loading apparatus which includes a tape guiding assembly in accordance with an embodiment of the present invention.

Referring to the drawings in detail, and initially to FIG. 1 thereof, it will be appreciated that the present invention may be applied to various types of tape recording and/or reproducing apparatus, such as, VTRs employing any one of the D-2 digital, Beta VHS or 8 mm. formats, and is shown applied to a video cassette recorder (VCR) 10, that is, a VTR intended for use with a tape cassette 11. The illustrated VCR 10 is shown to include a base 12 on which the conventional tape cassette 11 is suitably positioned. Such cassette 11 has a casing 11a, a supply reel 11b and a take-up reel 11c rotatably disposed within the casing 11a and on which a tape 13 is wound, and guides 11d within the casing 11a at opposite ends of a recess 11e provided in a front portion of the cassette casing 11a and by which the tape between the reels 11b and 11c is guided to extend across the open front of the recess 11e when the cassette 11 is not in use.

The tape loading apparatus provided in the VCR 10 may employ a so-called "M-loading" operation for withdrawing the tape 13 from within the cassette casing 11a operatively positioned on the base 12 and helically wrapping the withdrawn tape about the circumferential surface of a tilted rotary head drum 14 mounted on the base 12, as shown in full lines of FIG. 1. The head drum 14 conventionally has rotary heads (not shown) moving in a planar orbit coinciding with the circumferential surface of the drum for recording or reproducing video or other information signals in slant tracks scanned by the rotary heads on the tape wrapped about the drum 14 between a tape-entry position 15a and a tape-exit position 15b. Also mounted on the base 12 are suitably positioned fixed tape guides 16a, 16b, 16c, 16d and 16e, an erasing head 17, a fixed head assembly 18 used, for example, for recording and reproducing an audio signal and a control or CTL signal in longitudinal tracks on the tape, and a capstan 19.

The tape loading operation is effected, in part, by a main loading section including tape guiding devices 20a and 20b mounted on sliders 21a and 21b (FIG. 2) which are suitably guided, as hereinafter further described, for movements indicated by the arrows a on FIG. 1 between initial or unloaded positions, shown in broken lines on FIG. 1, where the tape guiding devices 20a and 20b extend upwardly into the recess 11e of the operatively positioned cassette 11 in back of the run of the tape then extending across such recess, as indicated at 13a, and operative or loaded positions, indicated on full lines on FIG. 1, and at which the tape guiding devices 20a and 20b respectively guide the withdrawn tape 13 to and from the surface of the rotary head drum 14, adjacent the tape-entry and tape-exit positions 15a and 15b, respectively.

The VCR 10 is further shown to include a pinch roller 24 and auxiliary loading guide elements 22a and 22b which are included in an auxiliary loading and tape tension limiting mechanism and are mounted, as hereinafter described in detail, for movement between initial or unloaded positions, shown in broken lines on FIG. 1, where the pinch roller 24 and auxiliary loading guide elements 22a and 22b also extend upwardly into the recess 11e of the operatively positioned tape cassette 11, and operative or loaded positions, indicated in full lines on FIG. 1, and at which the pinch roller 24 is positioned adjacent the capstan 19 and the auxiliary loading guide elements 22a and 22b form respective bights 23a and 23b directed laterally away from the drum 14 in the withdrawn tape between the cassette 11 and the drum 14. It will be apparent that the movements of the auxiliary loading guide elements 22a and 22b to their loaded positions are effective to bring the withdrawn tape into contact with the fixed erasing head 17 and the fixed heads 18 for recording and reproducing audio and CTL or control signals. After the tape 13 has been loaded, as generally described above, the pinch roller 24 is conventionally further moved against the capstan 19 with the tape therebetween for longitudinally advancing the tape along the described path, while the tape is unwound from the supply reel 11b and rewound on the take-up reel 11c. During such movement of the tape, the rotary heads associated with the drum 14 and the fixed heads 17 and 18 can record or reproduce signals on the tape.

Figure 5A:
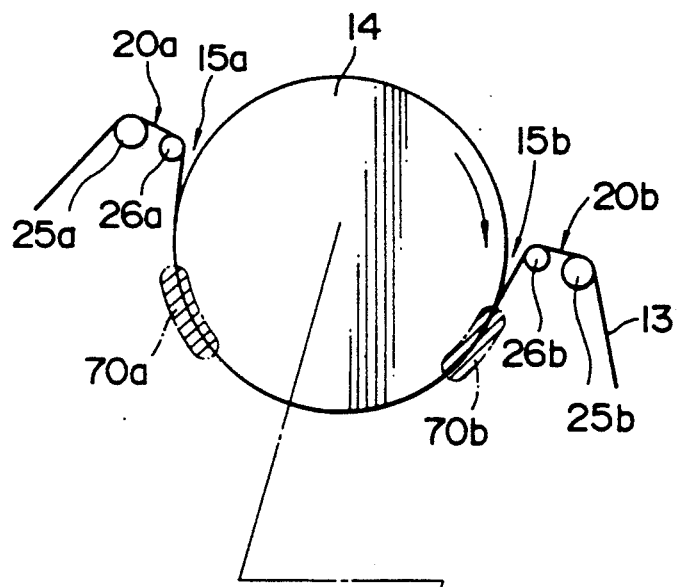
FIGS. 5A and 5B are a plan view and a front elevational view showing details of the tape guiding devices in the main loading section of the tape loading apparatus in accordance with an embodiment of the present invention.
Figure 5B:
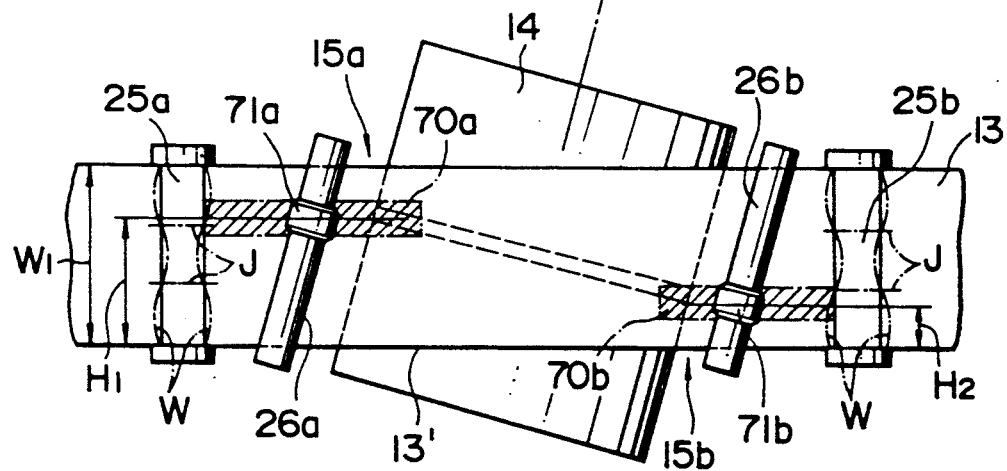

In the tape loading apparatus having a main loading section in accordance with the present invention, the tape guiding device 20a includes on the slider 21a an ultrasonically vibrated tape guide 25a and a relatively angled auxiliary guide element 26a which is disposed for engagement by the tape between the vibrated tape guide 25a and the tape entry position 15a when the tape guiding device 20a is in its loaded position shown on FIGS. 5A and 5B. The tape guiding device 20b similarly includes on the slider 21b an ultrasonically vibrated tape guide 25b and a relatively angled auxiliary guide element 26b disposed for engagement by the tape between the vibrated tape guide 25b and the tape-exit position 15b when the tape guiding device 20b is in its loaded position. As shown particularly on FIG. 5B, the auxiliary guide elements 26a and 26b are oppositely angled in respect to the related vibrated tape guides 25a and 25b for controlling the winding and spiraling angles of the tape 13 as it is helically wrapped around the rotary head drum 14 with a wrap angle of about 180°.

Figure 2:
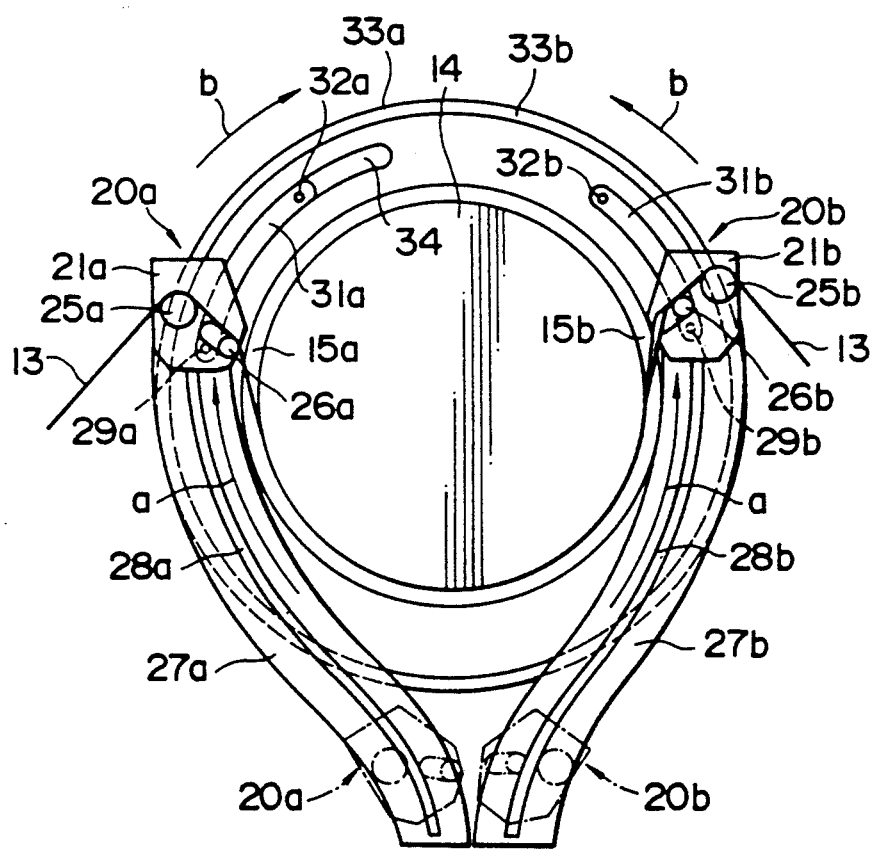
FIG. 2 is a plan view showing drive rings and guide rails of a main loading section of the tape loading apparatus schematically represented on FIG. 1 for effecting movements of tape guiding devices between loaded and unloaded positions.

As shown particularly on FIG. 2, the main loading section further includes a pair of horizontally disposed, oppositely curving guide rails 27a and 27b extending from the unloaded positions to the loaded positions of the tape guiding devices 20a and 20b, respectively, and on which the tape guiding devices 20a and 20b are slidably mounted. The guide rails 27a and 27b have respective curving slots 28a and 28b extending therealong, and connecting pins 29a and 29b extend downwardly through the slots 28a and 28b from the sliders 21a and 21b slidable on the upper surfaces 30a and 30b of the guide rails. Drive links 31a and 31b are pivotally connected, at one end, to the connecting pins 29a and 29b, while the opposite ends of the links 31a and 31b are pivotally connected, as at 32a and 32b (FIG. 2), to superposed counter-rotatable drive rings 33a and 33b, respectively, which extend around the guide drum 14. The upper drive ring 33b has an arcuate slot 34 therein to permit the pivotal connection 32a to extend therethrough from the lower drive ring 33a to the drive link 31a. When a suitable motor-driven drive mechanism (not shown) turns the drive rings 33a and 33b in the opposite directions indicated by the arrows b on FIG. 2, the links 31a and 31b are effective to drive the sliders 21a and 21b, and hence the tape guiding devices 20a and 20b, in the directions of the arrows a from their unloaded positions shown in broken lines toward their loaded positions.

It is to be noted that, in the herein disclosed auxiliary loading and tape tension limiting mechanism embodying this invention, the auxiliary loading guide element 22a acts to load the tape 13b at the tape supply side, that is, between the supply reel 11b and the drum 14, and also as a tension regulator for the tape supply side, in addition to avoiding excessive tension in the tape at the tape supply side. On the other hand, the other auxiliary loading guide element 22b only acts to load the tape at the tape take-up side 13c and to prevent the occurrence of excessive tension in the tape at the tape take-up side. Thus, tension control at the tape take-up side 13c is provided by a suitable tension regulator which forms no part of the present invention and which has a tension sensing guide pin 35 against which the tape in the bight 23b is made to engage in response to the movement of the auxiliary loading guide element 22b to its loaded position.

Figure 3:
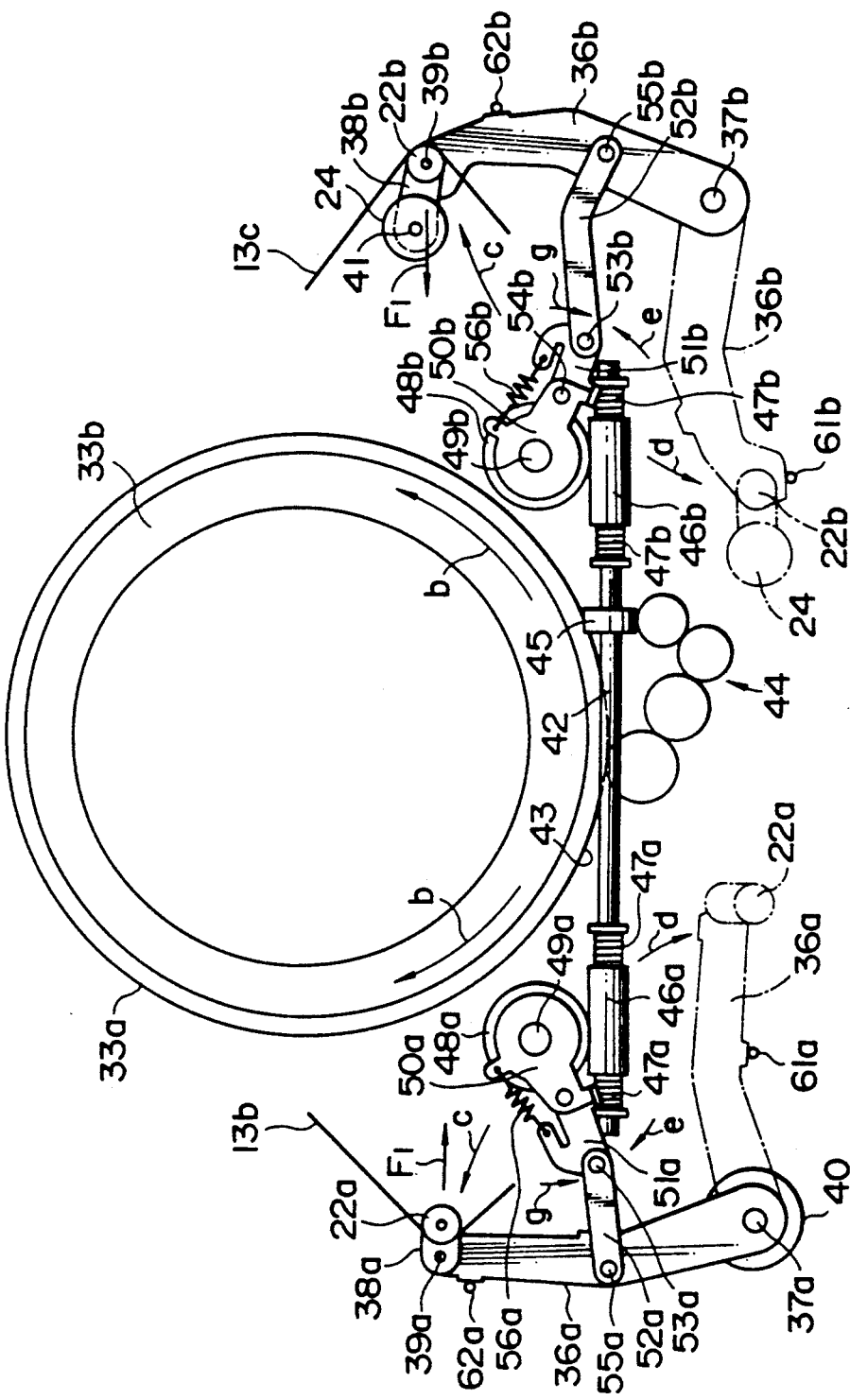
FIG. 3 is a plan view showing an auxiliary loading and tape tension limiting mechanism included in the tape loading apparatus.

As shown on FIG. 3, horizontal support arms 36a and 36b are mounted, at one end, on shafts 37a and 37b for pivotal movements about such shafts in the directions of the arrows c and d, and the auxiliary loading guide elements 22a and 22b are mounted on the support arms 36a and 36b, respectively, adjacent the free ends of the latter. More specifically, the guide element 22a is rotatably mounted on one end of a support link 38a which, at its other end, is pivotally mounted on a pin 39a at the free end of support arm 36a. A suitable tape tension detector 40 which forms no part of the present invention is coaxially mounted on the shaft 37a for detecting the tension in the tape supply side 13b. The other auxiliary loading guide element 22b is rotatable on a shaft 39b carried by the free end portion of the support arm 36b, and a pinch roller support arm 38b is pivotally mounted, at one end, on the shaft 39b and, at its other end, carries a shaft 41 on which the pinch roller 24 is rotatable.

A driving shaft 42 is rotatably mounted so as to extend horizontally between the support arms 36a and 36b, and a peripheral gear 43 on the drive ring 33a drives a gear train 44 which meshes with a pinion 45 on the shaft 42 for driving the latter. Worm gears 46a and 46b are mounted on opposite end portions of the shaft 42, and are rotatably coupled with the latter through torque limiter springs 47a and 47b. The worm gears 46a and 46b mesh with worm wheels 48a and 48b, respectively, which are rotatable about fixed vertically extending shafts 49a and 49b. Driving arms 50a and 50b are rotatably coupled with the worm wheels 48a and 48b, respectively, so as to turn therewith about the shafts 49a and 49b.

Limiting mechanisms are employed for connecting the drive arms 50a and 50b with the respective support arms 36a and 36b. For example, as shown on FIG. 4A, the limiting mechanism connecting drive arm 50a with the support arm 36a includes links 51a and 52a having their adjacent ends pivotally connected, as at 53a, while the other end of the link 51a is pivotally connected to the free end of the driving arm 50a by a pin 54a, and the end of the link 52a remote from the link 51a is pivotally connected, as at 55a, to an intermediate portion of the support arm 36a. A tension spring 56a extends between a spring anchor tab 57a on the driving arm 50a and an anchor tab 58a on the link 51a for urging the latter about the pin 54a in the clockwise direction relative to the driving arm 50a, as viewed on FIG. 4A. Such spring-urged movement of the link 51a relative to the driving arm 50a is limited, to the position shown on FIG. 4A, by a tab 59a directed laterally from the link 51a and engageable with a lug 60a extending from the driving arm 50a.

Figure 4A:
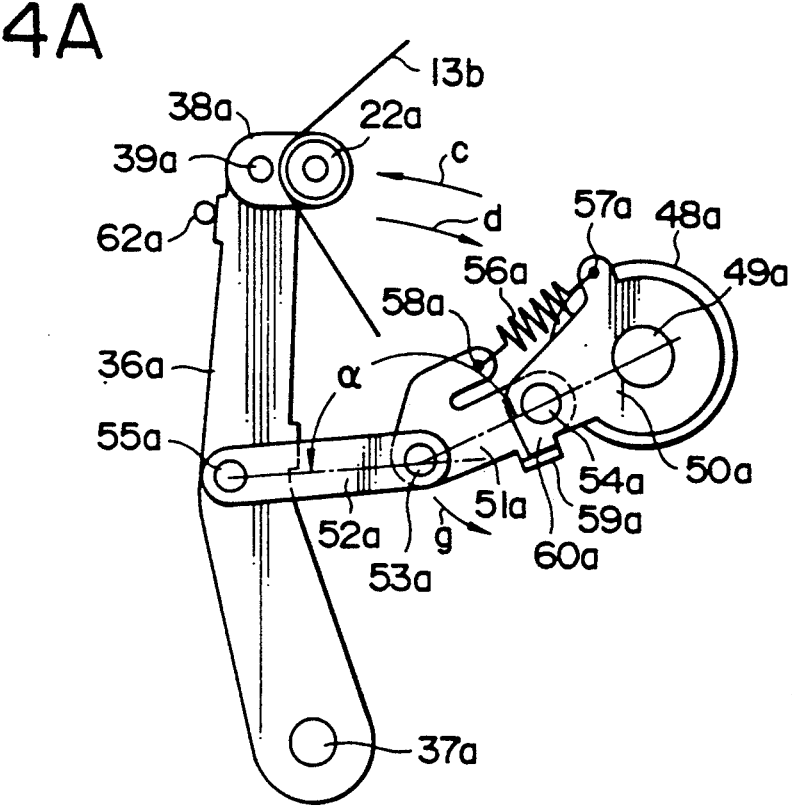
FIGS. 4A and 4B are enlarged, fragmentary plan views of a portion of the auxiliary loading and tape tension limiting mechanism shown in two different positions, and to which reference will be made in explaining the operation of such mechanism.

Further, as shown on FIG. 4A, the links 51a and 52a are dimensioned and the tab 59a and lug 60a are disposed so that, with the auxiliary loading guide element 22a in the loaded position, lines extending from the axis of the pivot pin 53a to the axes of the pivot pins 54a and 55a, respectively, include an obtuse angle a opening in the direction in which the spring 56a urges the link 51a to turn relative to the driving arm 50a. The spring 56a is shown as a tension spring and is designed to be stronger than the torque limiter springs 47a by which rotation of the driving shaft 42 is transmitted to the worm gear 46a.

As is apparent on FIG. 3, the limiting mechanism connecting the drive arm 50b with the support arm 36b similarly includes links 51b and 52b pivotally connected to each other, as at 53b, and also pivotally connected to the driving arm 50b, as at 54b, and to the support arm 36b, as at 55b. Further, a tension spring 56b extends between anchor tabs on the drive arm 50b and on the link 51b for urging the latter in the counterclockwise direction, as viewed on FIG. 3, relative to the drive arm 50b. Such spring-urged movement of the link 51b relative to the driving arm 50b is limited in a manner similar to that described above with reference to FIG. 4A.

The operation of the auxiliary loading and tape tension limiting mechanism described above is as follows:

In its unloading state, the support arms 36a and 36b are turned in the directions of the arrows d to their respective unloaded positions shown in broken lines on FIG. 3, and at which the arms 36a and 36b engage respective stops 61a and 61b.

Thereafter, when the drive rings 33a and 33b are rotated in the directions of the arrows b, the tape guiding devices 20a and 20b are moved, as previously described, from their unloaded positions in the directions of the arrows a on FIG. 2, to their loaded positions. At the same time, the peripheral gear 43 on the drive ring 33a, the gear train 44 and the pinion 45 on the shaft 42 cause rotation of the latter in a forward direction. Such rotation of the driving shaft 42 is transmitted through the torque limiting springs 47a and 47b, the worm gears 46a and 46b, and the worm wheels 48a and 48b so as to cause turning of the driving arms 50a and 50b in the directions of the arrows e on FIG. 3. During such turning of the driving arms 50a and 50b, the springs 56a and 56b are effective to cause the links 51a and 51b to turn together with the respective driving arm 50a and 50b in the direction of the arrows e. Turning of the links 51a and 51b together with the respective driving arms 50a and 50b causes the links 52a and 52b to drive the support arms 36a and 36b in the directions of the arrows c from their unloaded positions to their loaded positions shown in full lines on FIG. 3, and at which the arms 36a and 36b engage respective stops 62a and 62b, respectively. During the movement of the support arms 36a and 36b toward their loaded positions, the auxiliary loading guide elements 22a and 22b on the support arms 36a and 36b pull the tape at the tape supply side 13b and the tape take-up side 13c out of the tape cassette 11 in the directions indicated by the arrows f on FIG. 1.

With the tape 13 loaded as shown on FIG. 1, the tape may be run at a high speed in the fast-forward or rewind mode. In such cases, if the tape 13 runs unchecked due to an error or defect in a tape drive servo system, in a tape reel diameter sensing device or in a tape end sensor, an abnormal or excessive tension develops in the tape at the guide elements 22a and 22b with the result that a large force $F_1$ acts laterally inward on the free end of each of the support arms 36a and 36b.

Figure 4B:
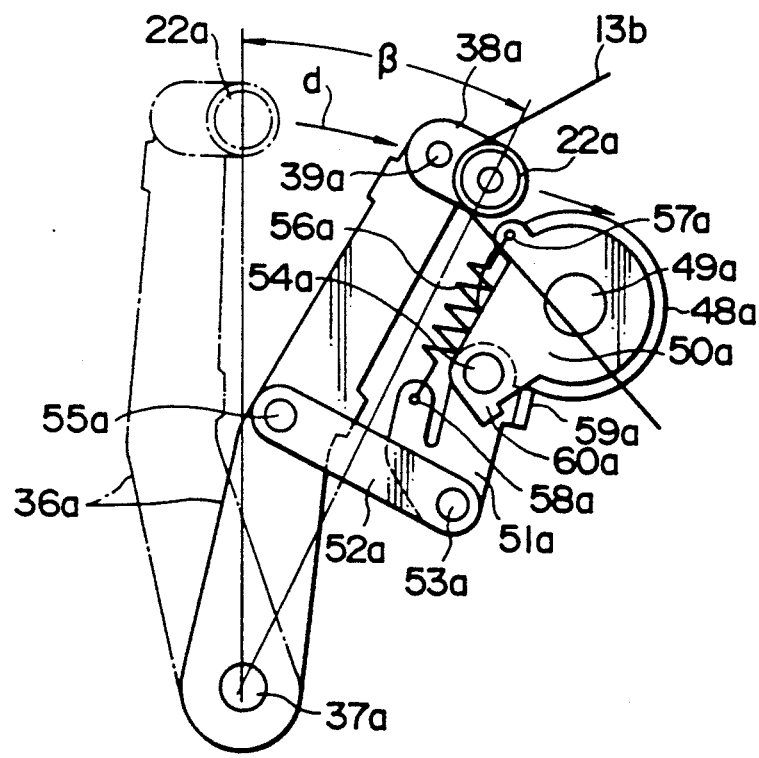

The moment the excessive tension occurs in the tape at the tape supply side 13b, the resulting force $F_1$ acting on the arm 36a at its free end causes an even larger force to be transmitted from the pivot 55a on arm 36a through link 52a to the pivot 53a. Such transmitted force acts in the longitudinal direction of the link 52a and, by reason of the angle a, the line of force is offset from the pivot 54a connecting the link 51a to the driving arm 50a, as shown on FIG. 4A. Accordingly, a turning moment acts on the link 51a in the direction of the arrow g which overcomes the force of the spring 56a and thereby turns the link 51a relative to the driving arm 50a to the position shown on FIG. 4B. Thus, the links 51a and 52a are turned relative to each other from their relatively extended condition of FIG. 4A to the contracted or V-shaped condition shown on FIG. 4B. It will be appreciated that, when the links 51a and 52a assume the V-shaped or contracted condition shown on FIG. 4B, the respective support arm 36a and the auxiliary loading guide element 22a mounted thereon are free to move through a large stroke $\beta$ to the position shown on FIG. 4B at which the excessive tension acting on the tape is immediately released for avoiding the various problems that might otherwise be triggered by the excessive tension, such as, breakage of the tape, or damage to the guide element 22a or the described mechanism for actuating its support arm 36a.

Of course, the links 51b and 52b connecting the support arm 36b with the respective driving arm 50b will similarly respond to an excessive tension acting on the tape take-up side 13c engaged by the guide element 22b.

It will be appreciated that the length ratios of the links 51a and 52a connecting the support arm 36a to the driving arm 50a, and of the links 51b and 52b connecting the support arm 36b to the driving arm 50b may be varied, as also may be the strength of the limiter springs 56a and 56b which are employed for urging the links 51a and 52a, and the links 51b and 52b to their respective extended conditions. Such dimensional changes or adjustments may by made to select a desired size of the escape strokes $\beta$ for the support arms 36a and 36b, and also to select a desired value of the abnormal or excessive tension at which the arms 36a and 36b are made to move through such escape strokes.

After completion of the loading operation, that is, when the tape guiding devices 20a and 20b are in their loaded positions so that the tape 13 is wrapped helically about the circumferential surface of the drum 14 from the tape-entry position 15a to the tape-exit position 15b, as on FIGS. 5A and 5B, the ultrasonically vibrated tape guides 25a and 25b may be operated, for example, at frequencies of 100 to 150 kHz with an amplitude of about 1 $\mu$m. The purpose of such vibration is to reduce the frictional resistance to movement of the tape 13 past the engaged surfaces of the vibrated tape guides 25a and 25b and the adjacent auxiliary guide elements 26a and 26b, respectively. When the vibrated tape guides 25a and 25b are operated, a standing wave vibration is generated, as indicated in broken lines at W on FIG. 5B, with the standing wave having a pair of nodes J spaced apart in the axial direction of each of the vibrated tape guides 25a and 25b. As a result of the foregoing, vibrations are propagated along the tape, particularly, along edge portions of the tape. If such vibrations propagated along the tape by the ultrasonically vibrated tape guides 25a and 25b are allowed to travel past the relatively angled auxiliary guide elements 26a and 26b to the portion of the tape wrapped about the drum 14, the error rate in digitally recorded video or other signals is known to increase substantially, particularly in the signals recorded or reproduced at the shaded regions 70a and 70b shown adjacent the tape-entry position 15a and the tape-exit position 15b on FIGS. 5A and 5B. Conventionally, the incidence of such errors is known to reach error rates of $1 \times 10^{-5}$ to $3 \times 10^{-4}$. Due to the helical wrap of the tape 13 about the drum 14, errors occur at different heights measured in the widthwise direction of the tape 13 in the region 70a adjacent the tape-entry position 15a, and in the region 70b adjacent the tape-exit position 15b. For a tape 13 having a width $W_1$ of 19 mm, errors occurring at the region 70a adjacent the tape-entry position 15a will be at a height $H_1$ of about 14 mm measured from the lower tape edge 13', while errors appearing at the region 70b adjacent the tape-exit position 15b will be at a height $H_2$ of about 9 mm measured from the lower tape edge 13'. In other words, errors due to the propagated vibration are concentrated on the tape 13 in longitudinal bands respectively corresponding to the widthwise positions on the tape where the rotary heads enter into contact with, and leave the tape wrapped about the drum 14.

Figure 6A:
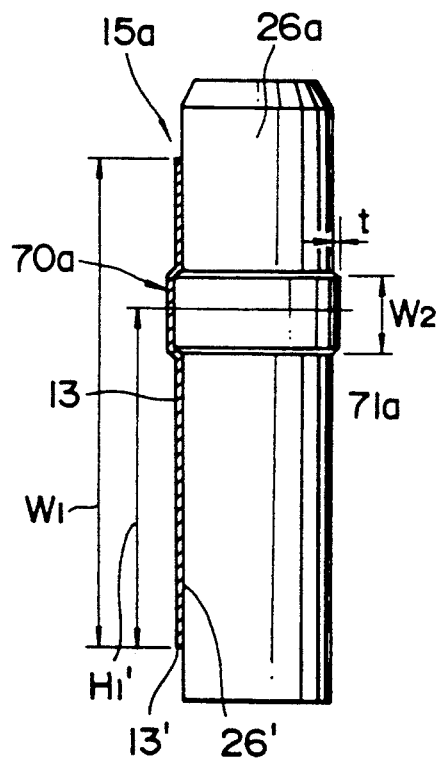
FIGS. 6A and 6B are enlarged side elevational views of respective auxiliary guide elements associated with ultrasonically vibrated tape guides in the tape guiding devices of FIGS. 5A and 5B.
Figure 6B:
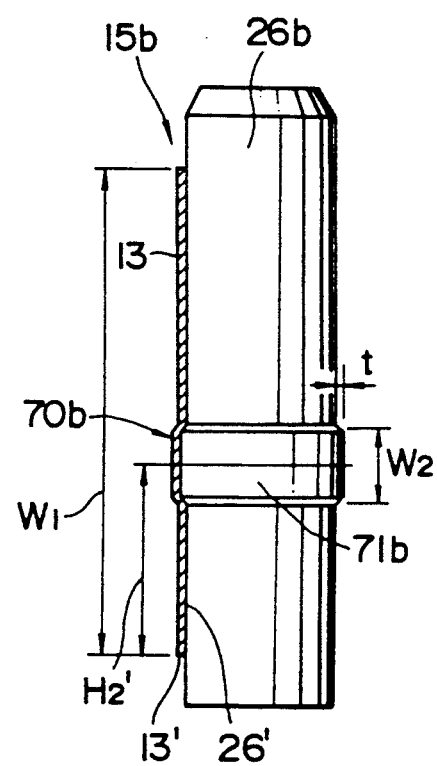

Referring now to FIGS. 5B, 6A and 6B, it will be seen that the above described problem is avoided in accordance with the present invention by providing the auxiliary guide elements 26a and 26b with respective surface projections 71a and 71b extending therefrom at positions along the auxiliary guide elements 26a and 26b corresponding to the widthwise portions of the tape 13 at which the rotary head or heads associated with the drum 14 scan the tape adjacent the tape-entry and tape-exit positions 15a and 15b, respectively. More specifically, in the illustrated embodiment, the surface projections 71a and 71b are in the form of annular, diametrically enlarged portions of the cylindrical surfaces of the respective guide elements 26a and 26b. The projection 71a on the guide element 26a is located at an axial distance $H'_1$ along the guide element 26a measured from the lower edge 13' of the tape, as engaged with the guide element 26a, which is equivalent to the height $H_1$ of the region 70a in which errors would occur near the tape-entry position 15a. Similarly, the projection 71b on the guide element 26b is located at an axial position $H'_2$ along the guide element 26b measured from the position at which the lower edge 13' of the tape runs over the guide element 26b and which is equivalent to the height $H_2$ of the region 70b from the lower edge of the tape. In a specific example of this embodiment of the invention, each of the annular raised projections 71a and 71b has an axial width $W_2$ of about 2 to 3 mm and protrudes radially beyond the remaining cylindrical surface 26' of the guide element 26a or 26b a distance t of about 20 to 40 $\mu$m.

When the angled auxiliary guide elements 26a and 26b are provided with the projections 71a and 71b, respectively, as described above, the deterioration of the video signal error rate attributable to vibrations generated by the ultrasonically vibrated tape guides 25a and 25b is prevented, as follows:

During a recording or reproducing operation, the tape is conventionally under tension, for example, as regulated in response to the tape tension detector 40 associated with the support arm 36a and/or the tension regulator which includes the tension sensing guide pin 35. By reason of such tape tension, the tape 13 wrapped about the rotary head drum 14 is held taught between the ultrasonically vibrated tape guides 25a and 25b near the tape-entry position 15a and the tape-exit 15b, respectively. As the tape 13 is longitudinally advanced by the capstan 19 and pinch roller 24, the projections 71a and 71b on the angled auxiliary guide elements 26a and 26b relatively increase the tape tension in the widthwise portions of the tape located at the heights $H_1$ and $H_2$ from the lower edge 13' of the tape near the tape-entry position 15a and the tape-exit position 15b. The increased tension is, in each instance, produced over a width $W_2$ at widthwise positions on the tape which correspond to the error-prone regions 70a and 70b.

When the ultrasonically vibrated tape guides 25a and 25b are made to vibrate at frequencies of 100 to 150 kHz with an amplitude of about 1 $\mu$m, the partial increase in the tension considered across the tape 13 resulting from the projections 71a and 71b on the angled auxiliary guide elements 26a and 26b, respectively, and the resulting relatively high-pressure contact of the tape with these projections 71a and 71b, serve to clamp out at the guide elements 26a and 26b most of the tape vibrations resulting from the ultrasonically vibrated tape guides 25a and 25b. Thus, the vibrations are not propagated further along the tape onto the drum 14 at the tape-entry and tape-exit positions 15a and 15b.

As a result of the foregoing, with both of the ultrasonically vibrated tape guides 25a and 25b allowed to vibrate during recording or reproducing operations, the VCR embodying this invention achieves an improved video signal error rate of about $1 \times 10^{-5}$, as compared with the video signal error rate of about $3 \times 10^{-4}$ if the ultrasonically vibrated tape guides are operated during a recording or reproducing operation and the projections 71a and 71b characteristic of the present invention are not provided. Accordingly, in the VCR embodying this invention, the ultrasonically vibrated tape guides 25a and 25b are operated in the recording and reproducing modes, as well as in the fast-forward and rewind modes, whereby to minimize the frictional resistance to movement of the tape during all operations for economizing on power consumption.

Figure 10:
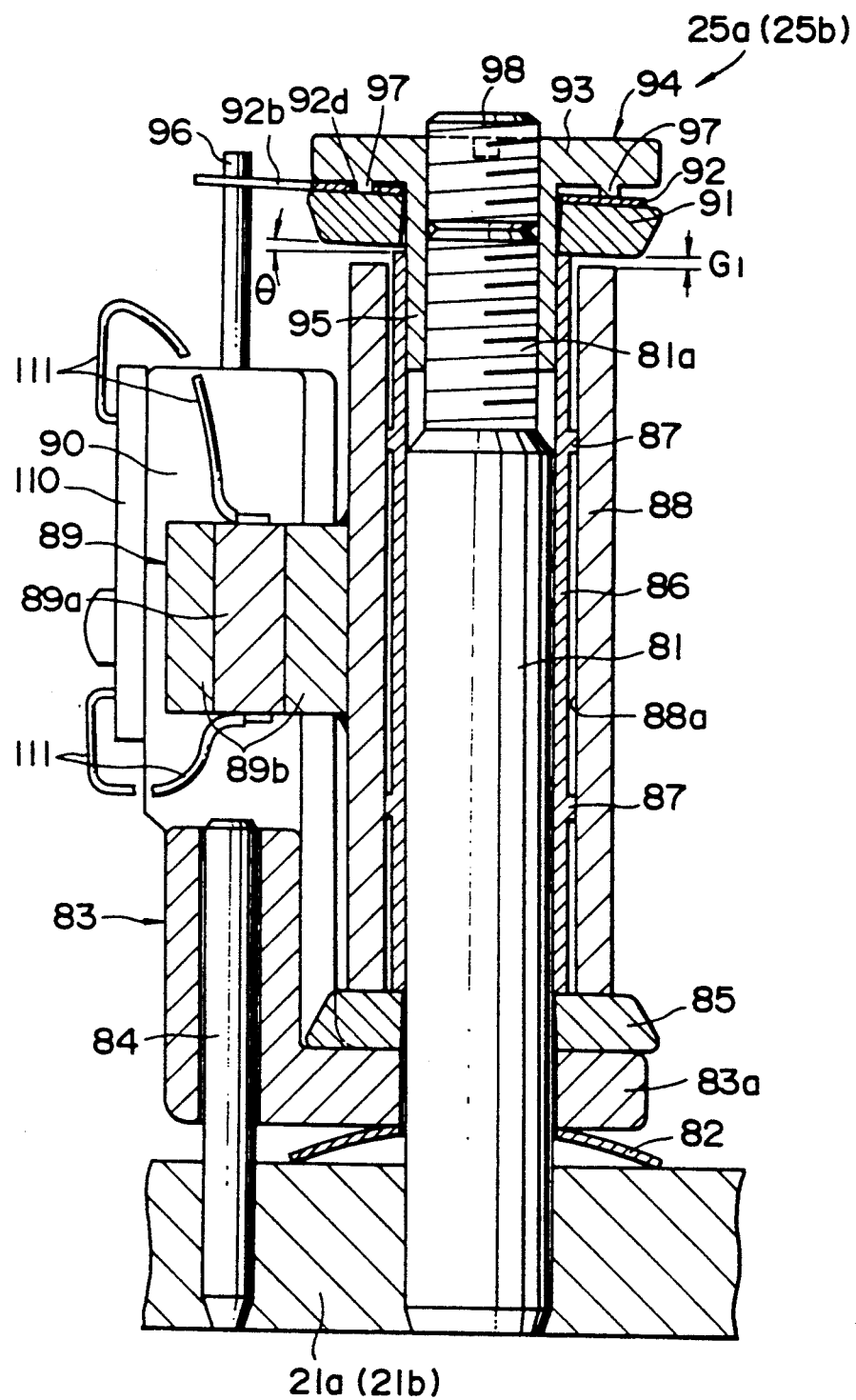
FIG. 10 is an enlarged sectional view of the ultrasonically vibrated tape guide as viewed along the line X—X on FIG. 9.
Figure 11:
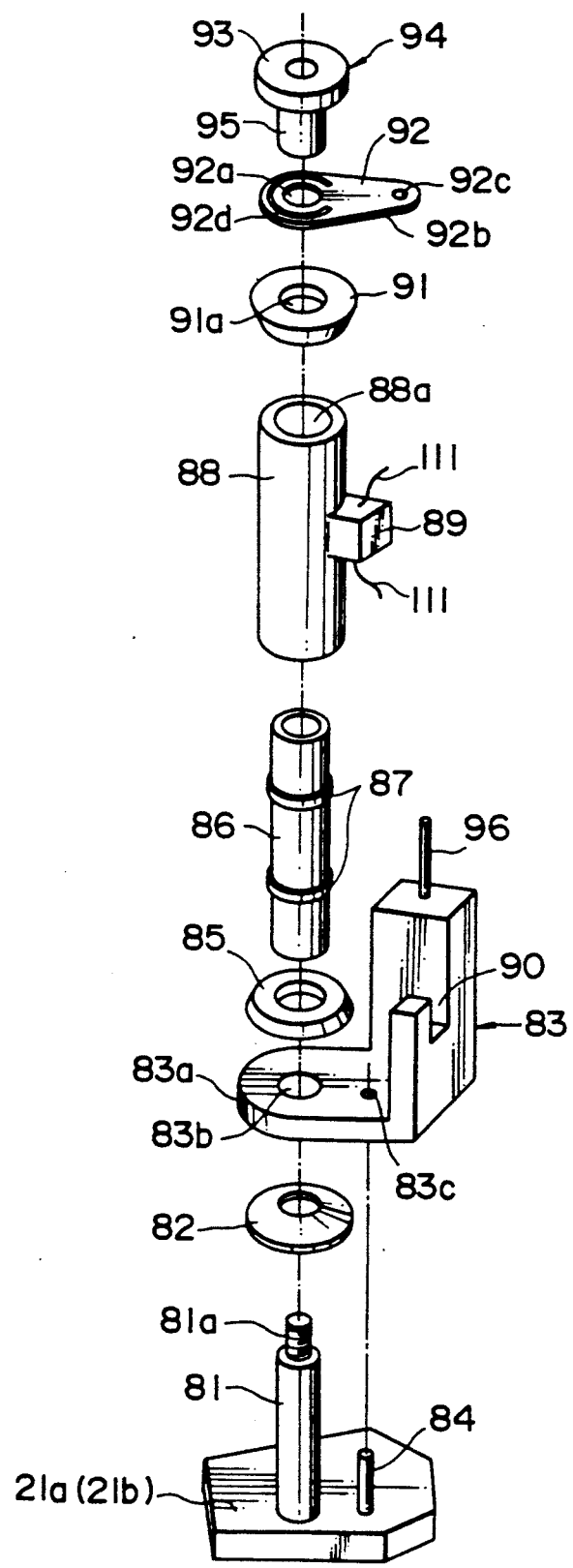
FIG. 11 is an exploded perspective view of the elements included in the ultrasonically vibrated tape guide of FIGS. 9 and 10.

Referring now to FIGS. 10 and 11, it will be seen that, in accordance with an embodiment of this invention, each of the ultrasonically vibrated tape guides 25a and 25b includes an upstanding support shaft 81 having its lower end portion suitably fixed in the respective slider 21a or 21b. A concavo-convex disc spring 82 extends around the shaft 81 immediately above the slider 21a or 21b, and a vibrator holder 83 molded or otherwise formed of an insulating material, such as, an acrylic resin, has a base portion 83a with a suitably dimension hole 83b for slidably receiving the shaft 81. An elongated locating pin 84 also extends upwardly from the slider 21a or 21b and is slidably received in a bore 83c in the base portion 83a of holder 83 when the latter is installed on the shaft 81 above the spring 82. A lower flange 85 of a wear-resisting material, such as, a ceramic, is in the form of a ring which is movable on the shaft 81 above the base portion 83a of the holder 83. A cylindrical bushing 86 is dimensioned to be slidable on the support shaft 81 so as to rest, at its lower edge, on the lower flange 85, with the bushing 86 having bearing rings 87 spaced apart in the axial direction on the outer surface of such bushing.

A tubular tape guide 88 which has an ultrasonic vibration generator 89 bonded or otherwise suitably fixed to a side of the guide 88 midway between the ends of the latter, is diametrically dimensioned to extend telescopically over the bushing 86 and is supported, at its inner surface 88a, by the bearing rings 87 on the bushing. When the tubular tape guide 88 is thus installed, the vibration generator 89 thereon is received in, and embraced by the sides of a recess 90 formed in the holder 83. Thus, the holder 83 which is positioned about the axis of the support shaft 81 by the engagement of the locating pin 84 in the hole 83b of the holder, is effective to similarly position the tubular tape guide 88 and the vibration generator 89 thereon by the engagement of the latter in the recess 90.

The support shaft 81 has a reduced diameter, threaded upper end portion 81a which, as shown on FIG. 10, may barely extend upwardly out of the bushing 86. An upper flange 91 which is also in the form of a ring of wear-resistant material, such as, a ceramic, extends, with substantial radial clearance, about the upper end of shaft 81, and rests on the upper end edge of the bushing 86. A spacer 92 for canting or inclining the upper flange 91 is interposed between the latter and the head 93 of a nut 94 which further includes an internally threaded cylindrical body 95 depending from the head 93. More specifically, the body 94 is dimensioned to be screwed onto the threaded upper end portion 81a of the support shaft 81, and is externally dimensioned to extend loosely through central openings 92a and 91a in the spacer 92 and upper flange 91, respectively, and then to be slidably received within the upper end portion of the bushing 86.

The spacer 92 is shown on FIG. 11 to have an ear 92b extending therefrom and formed with a hole 92c spaced from the hole 92a for slidably receiving a locating pin 96 extending upwardly from the holder 83. Such engagement of the pin 96 in the hole 92c serves to rotationally position the spacer 92 about the axis of the shaft 81. As shown on FIG. 10, the underside of the head 93 of nut 94 has a circular rib 97 depending therefrom, while the spacer 92 is shown on FIG. 11 to be formed with a part-circular arcuate slot 92d having a radius equivalent to that of the circular rib 97. Thus, when the nut 94 is screwed down on the upper end portion 81a of the shaft 81, only a portion of the rib 97 extends through the arcuate slot 92d into contact with the upper surface of the flange 91, while the remainder of the rib 97 bears against the upper surface of the spacer 92. By reason of the foregoing, the upper flange 91 is inclined or canted by the angle $\Theta$ relative to a plane perpendicular to the axis of the shaft 81. Such canting of the upper flange 91 has been found to avoid curling of the upper edge of the guided tape.

Figure 9:
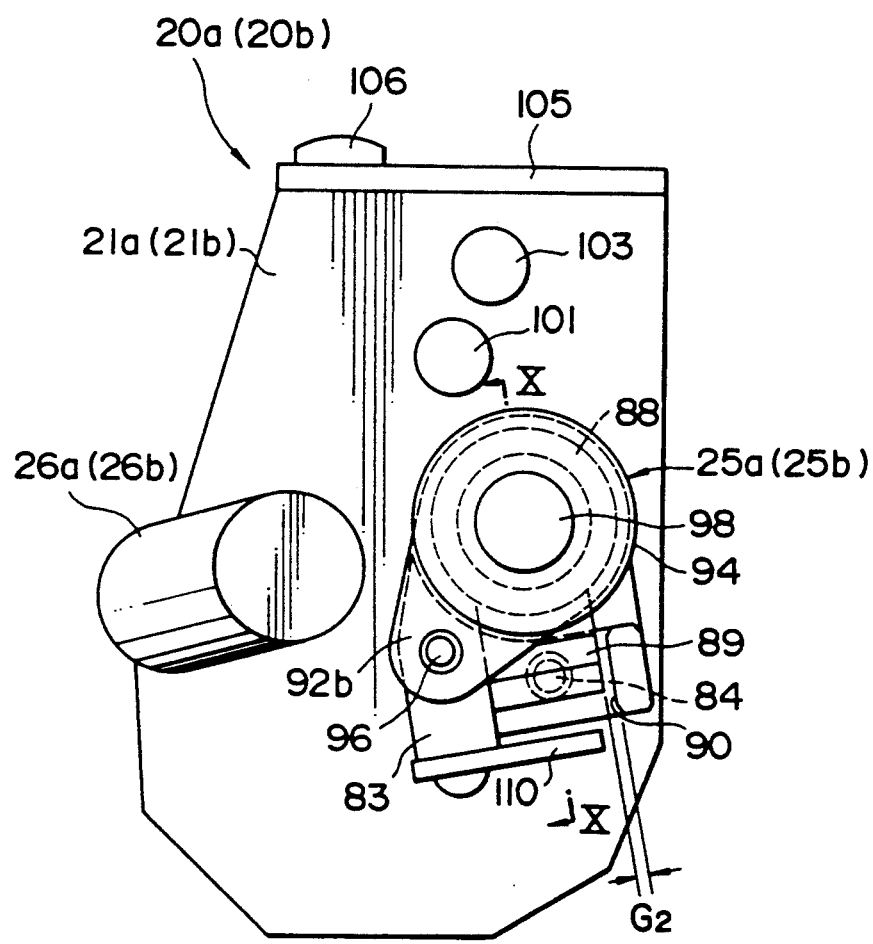
FIG. 9 is a detailed plan view of one of the tape guiding devices in which an ultrasonically vibrated tape guide is mounted along with an associated auxiliary guide element on a common base or slider in accordance with an embodiment of the invention.

As shown on FIG. 10, the axial length of the bushing 86 is slightly greater than that of the tubular tape guide 88 so as to leave a total axial gap $G_1$ of about 20 to 30 $\mu$m between the tubular tape guide 81 and the flanges 85 and 91. As shown on FIG. 9, a relatively larger gap $G_2$ of 0.1 to 0.2 mm is also desirably provided between the sides of the ultrasonic frequency generator 89 and the inside surfaces of the recess 90 provided in the holder 83 for receiving the generator.

The vibration generator 89 may be conventionally formed of a stack 89a of piezo-electric ceramic plates with positive and negative electrodes alternately interposed between the successive ceramic plates, and bonding or dummy layers 89b bonded to the opposite sides of the stack 89a and securing the same to the tubular tape guide 88.

Rotation of the nut 94 on the threaded end position 81a of the shaft 81 causes movement thereof in the direction of the axis of the shaft for adjusting the height of the holder 83, the lower and upper flanges 85 and 91, the bushing 86 and the tubular tape guide 88, as a unit, between the head 93 of the nut 94 and the spring 82.

Such height adjustment of the vibrated tape guide 25a or 25b leaves the gaps $G_1$ and $G_2$ unaffected. When the adjustment of the height is completed, a set screw 98 is screwed into the nut 94 to bear against the upper end of the shaft 81 and thereby lock the nut 94 in its adjusted position on the threaded end portion 81a. In order to assemble one of the ultrasonically vibrated tape guides 20a and 20b, it is only necessary to successively install from above, on the shaft 81, the spring 82, holder 83, lower flange 85, bushing 86, tubular tape guide 88, upper flange 91, and spacer 92, whereupon the nut 94 is screwed onto the threaded upper end portion 81a of the shaft 81. The foregoing simple assembly procedure makes it easy to replace the tubular tape guide 88 when necessary.

As earlier noted, the holder 83 is readily molded from an insulating material, such as, an acrylic resin, and the pin 84 determines the rotary direction of the holder 83 while permitting the axial adjustments thereof on the shaft 81. The bushing 86 is effective to precisely locate the tubular tape guide 88 so as to be coaxial with the shaft 81. Simply inserting the vibration generator 89 into the recess 90 of the holder 83 establishes the gap $G_2$ with sufficient precision. Because the nut 94 and the spring 82 press the upper and lower flanges 91 and 85 against the adjacent ends of the bushing 86, the precise dimensioning or machining of the bushing 86 and of the tubular tape guide 88 ensures that the gap $G_1$ is precisely maintained to permit the tubular tape guide 88 to vibrate efficiently in both axial and circumferential directions. Since the holder 83 is formed of an insulating material, the gap $G_2$ can be substantial so as to facilitate the assembly procedure when the replacement of the tubular tape guide 88 is required. Further, with the upper and lower flanges 91 and 85 formed of a wear-resistant material, such as, a ceramic, the durability of the assembly is enhanced.

The bearing rings 87 are intended to be located at nodes of the ultrasonic standing wave oscillation generated in the tubular tape guide 88. However, if the wave is slightly distorted there will be movements of the guide 88 relative to the bearing rings 87 so that, if such bearing rings are formed integral with the bushing 86 made of brass, noisy operation will result.

Figure 7:
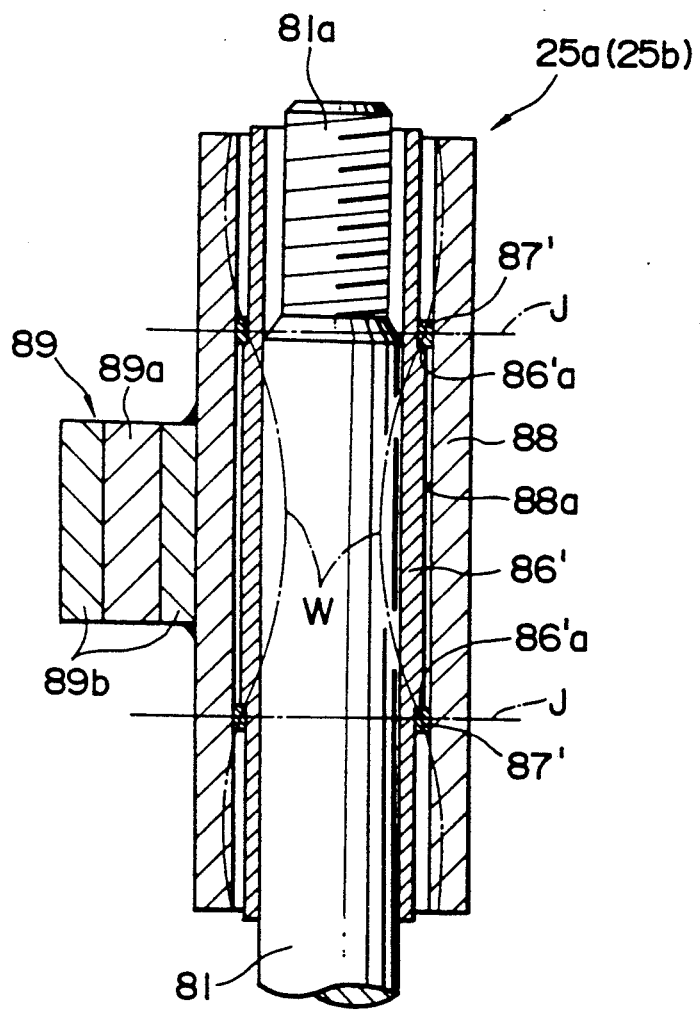
FIGS. 7 and 8 are longitudinal sectional views illustrating how a tubular tape guide which is ultrasonically vibrated in each tape guiding device is supported in accordance with two embodiments of the present invention.

Therefore, in accordance with an aspect of this invention, and as shown on FIG. 7, at least the bearing rings 87' which support the tubular tape guide 88 on the bushing 86' are formed of a shock-absorbing material, such as, a polycarbonate resin or rubber. In the case where the bushing 86' is otherwise formed of a metal, such as, brass, each bearing ring 87' is separately formed and fixedly mounted, as by bonding or the like, against a respective shoulder 86'a suitably positioned on the external surface of the bushing 86'. The bearing rings 87' of shock-absorbing material reduce the friction between the vibrated tubular tape guide 88 and the rings 87' on the bushing 86'. This prevents the occurrence of high-frequency resonance between the tubular tape guide 88 and the bushing 86', when both of these elements are formed of metal. Furthermore, reduction in the frictional resistance to vibration of the guide 88 permits the latter to vibrate more efficiently.

Figure 8:
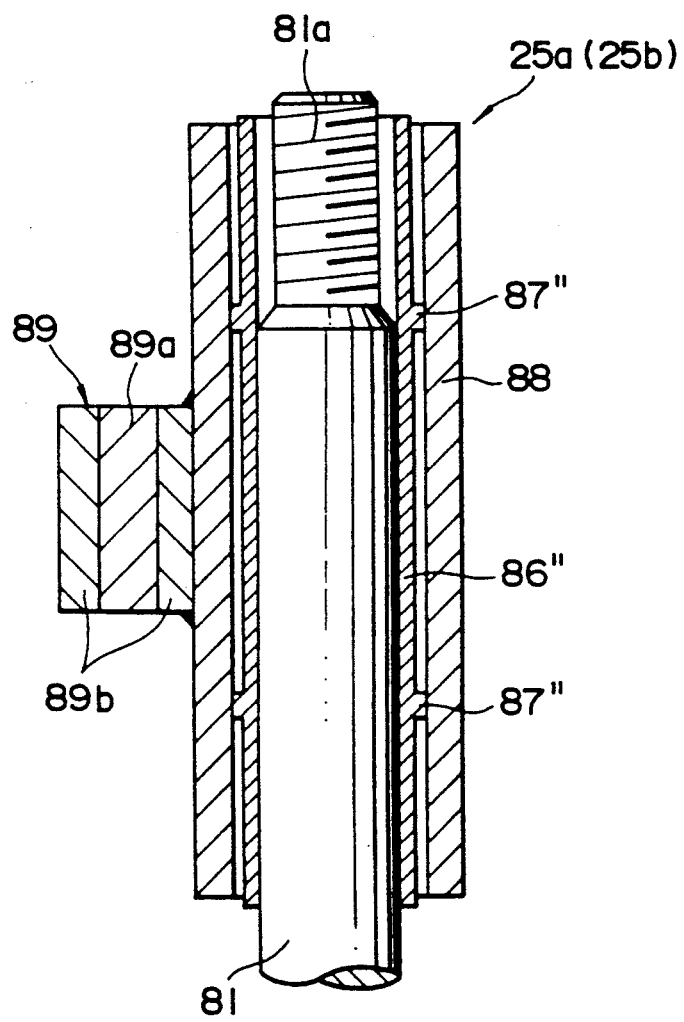

FIG. 8 illustrates a modification of the preferred arrangement for supporting the vibrated tubular tape guide 88, and in which the bushing 86" and the bearing rings 87" formed integrally therewith are made of a shock-absorbing material, such as, a polycarbonate resin, for achieving the same results as described with reference to FIG. 7.

The manner in which energizing power is supplied to the ultrasonically vibrated tape guide 25b of the tape guiding device 20b when the latter attains its loaded position will now be described with reference to FIGS. 12–15, and it will be understood that a similar arrangement is provided for supplying energizing power to the vibrated tape guide 25a of the tape guiding device 20a in the loaded position of the latter.

Figure 12:
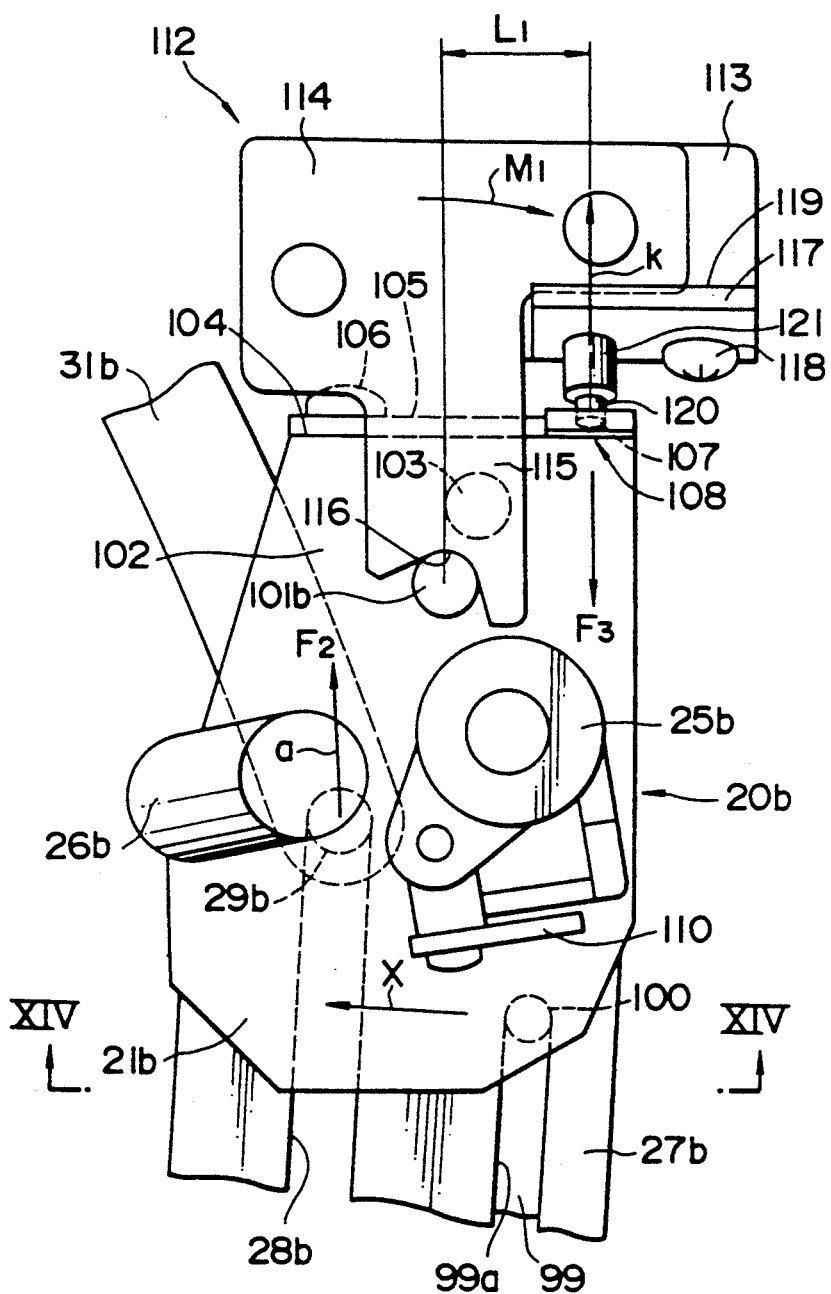
FIG. 12 is a plan view similar to that of FIG. 9, but showing the slider disposed on a guide rail at its loaded position determined by a stopper, and further showing an arrangement of mutually engageable contacts on the slider and stopper for supplying energizing power to the vibrated tape guide in the loaded position.
Figure 13:
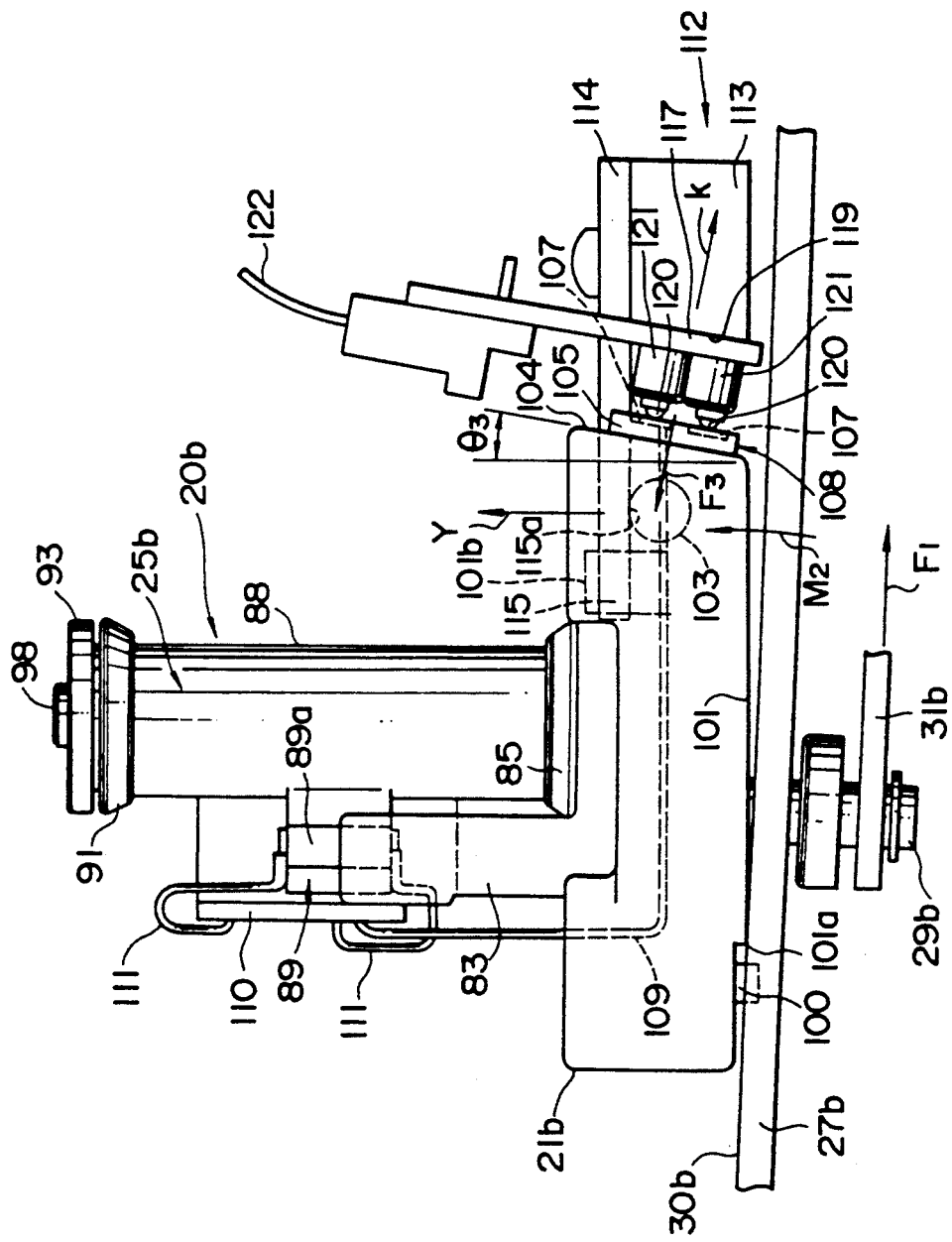
FIG. 13 is a side elevational view of the structure shown in FIG. 12.
Figure 14:
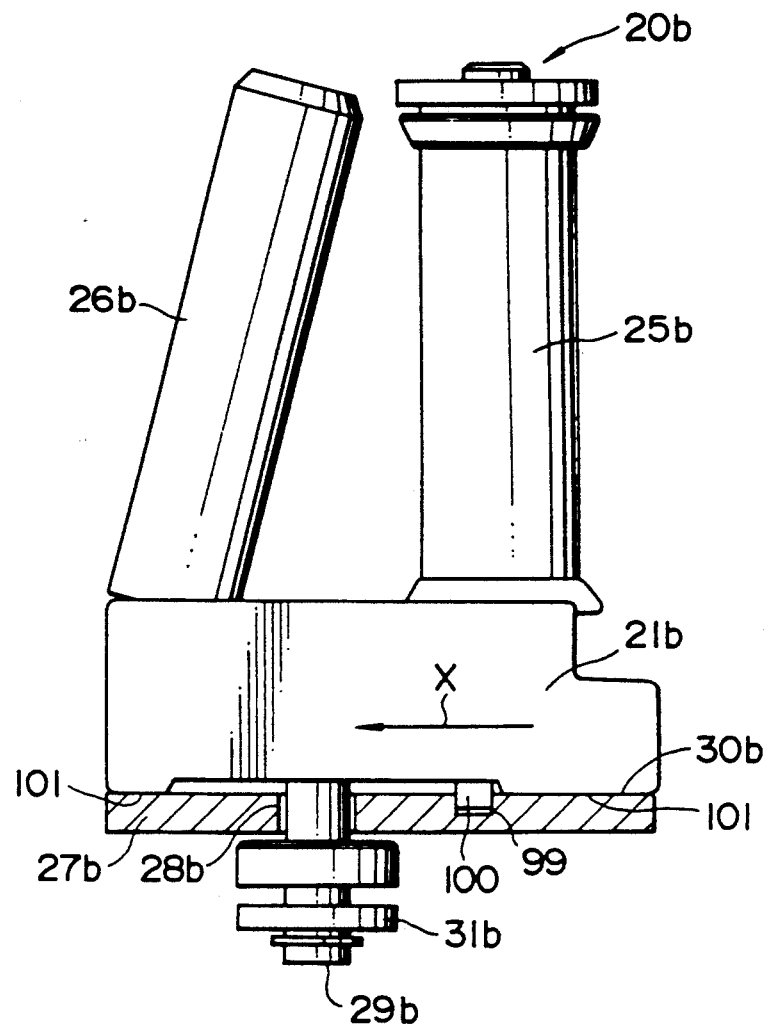
FIG. 14 is a sectional view taken along the line XIV—XIV on FIG. 12.
Figure 15:
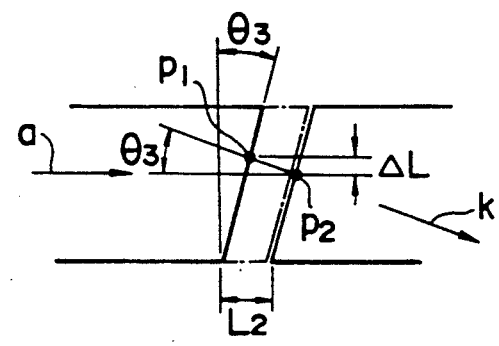
FIG. 15 is a diagrammatic side view to which reference will be made in explaining how a wiping action is achieved between the mutually engageable contacts for supplying energizing power to the respective vibrated tape guide in accordance with the invention.

As shown particularly on FIGS. 12 and 14, the curving slot 28b extending through the guide rail 27b is disposed at one side of the longitudinal median line of the guide rail which, at the other side of such median line, is formed with a shallow upwardly opening guide groove extending along the upper surface 30b of the guide rail parallel with the guide slot 28b. A relatively short guide pin 100 depends from the undersurface 101 of the slider 21b and engages in the shallow guide groove 99. A step 101a (FIG. 13) extends laterally in the undersurface of the slider 21b so that the slider may be rocked on such step, as hereinafter described. The pin 29b connected to the drive link 31b and the pin 100 cooperate with slot 28b and groove 99, respectively, for guiding slider 21b along the top surface 30b of the guide rail between the unloaded position and the loaded position.

An end portion 102 of the slider 21b, which is at the front of the latter as the slider moves in the direction of the arrow a on FIG. 12 toward the loaded position, carries a substantially laterally centered upstanding locater pin 101b. Further, a ball 103 is embedded in the upper surface of the front end portion 102 of the slider ahead of the locater pin 101. The end surface 104 of the front end portion 102 of the slider extends laterally substantially at right angles to the direction of movement of the slider 21b toward the loaded position, as indicated by the arrow a on FIG. 12. Further, the front end surface 104, as viewed from the side in FIG. 13, is inclined upwardly and forwardly at the angle $\Theta_3$ of about 10° relative to a perpendicular to the bottom surface 101 of the slider 21b. In other words, the front end surface 104 of the slider has a sloping overhang. A connector board 105 is secured by a screw 106 (FIG. 12) to the front end surface 104 of the slider. A pair of contacts 107 of a contact set 108 are provided at the front of the side portion of the connector board 105 which extends away from the drum 14 in the loaded position of the tape guiding device 20b. In other words, the contacts 107 on the connector board 105 are offset laterally by a distance $L_1$ (FIG. 12) from the locater pin 101b in the direction away from the rotary head drum 14. The contacts 107 are connected through harnesses 109 to a repeater board 110 secured to the holder 83. The repeater board 110 is, in turn, connected through harnesses 111 with electrodes at the opposite ends of the stack 89a of piezoelectric plates constituting the vibration generator 89.

A stopper device 112 for accurately locating the tape guiding device 20b at its loaded position is shown to include a fixed block 113 with a positioning plate 114 secured on the top surface thereof. The positioning plate 114 has an extending portion or shelf-like projection 115 which extends over the front end portion 102 of the slider 21b as the latter nears its loaded position. The shelf-like projection 115 has a notch 116 in its end edge for receiving the locater pin 101b when the slider 21b attains its loaded position, as shown on FIG. 12. At such time, the ball 103 embedded in the upper surface of the front end portion 102 of the slider is disposed under the shelf-like projection 115 and engageable against the underside of the latter for limiting upward movement of the front end portion 102 of the slider away from the respective guide rail 27b.

As shown on FIG. 12, the shelf-like projection 115 is substantially laterally centered in respect to the block 113 and, at the side of the projection 115 facing away from the drum, a connector board 117 is secured, as by a screw 118, to a surface 119 of the block 113 which is inclined from a perpendicular to the surface 30b of the guide rail 27b at the same angle $\Theta_3$ as the front end surface 104 on the slider.

Mounted on the connector board 117 are a pair of contacts 120 which, with the pair of contacts 107 on the connector board 105 complete the contact sets 108. The contacts 120 are inclined similarly to the connector board 117 and are constituted by contact pins spring urged to project or protrude from respective housings 121. A harness 122 is connected to the connector board 117 for supplying power to the contacts 120.

The above described arrangement for precisely locating the tape guiding device 20b at its loaded position and for there supplying power to its vibrated tape guide 25b operates as follows:

As the driving link 31b moves the slider 21b along the guide rail 30b toward the loaded position of the tape guiding device 20b in response to the turning of the respective drive ring 33b in the direction of the arrow b on FIG. 2, the forward end portion 102 of the slider moves under the shelf-like projection 115 of the positioning plate 114, and the ball 103 engages the underside of the shelf-like projection 115 while the locater pin 101 enters the notch or cutout 116. From the point where the locater pin 101 first enters the notch 116 to the point where the pin 101 engages the surface of the notch 116, as on FIG. 12, the slider 21b travels the distance $L_2$ (FIG. 15) in the direction of the arrow a. The contacts 107 on the connector board 105 first engage the extended, spring-urged contacts 120 on the connector board 117 as the locater pin 101 enters the notch 116 so that, during the further movement of the slider 21b through the distance $L_2$ to the loaded position, the contacts 120 are depressed in the inclined direction of the arrows k on FIGS. 13 and 15 which is at the angle $\Theta_3$ relative to the direction a of movement of the slider. As is shown particularly on FIG. 15, by reason of the angle $\Theta_3$ between the direction of movement of the slider, indicated by the arrow a, and the direction in which the contacts 120 are depressed, as indicated by the arrow k, during the final movement of the slider through the distance $L_2$ to its loaded position, the point of engagement of each contact 107 with the respective contact 120 moves from the point $P_1$ to the point $P_2$. In other words, the point of engagement between the depressible contact 120 and the respective contact 107 moves downwardly on the latter through the small distance $\Delta L$ determined by the below equation:

$$\Delta L = L_2 \Theta_3.$$

The relative sliding movements of the contacts 107 and 120 effect automatic cleaning thereof for removing any corrosion or foreign matter that may have collected therebetween and that would otherwise cause faulty contact or increased contact resistance. Thus, with the described arrangement embodying this invention, the engagement of the contacts 107 and 120 is such as to ensure that the ultrasonically vibrated tape guides 25a and 25b will be reliably supplied with power when in their loaded positions.

When the slider 21b has been moved to its loaded position and the contacts 107 and 120 are engaged, as described above, the continued exertion of a driving force $F_1$ (FIG. 13) by way of the link 31b on the pin 29b causes angular moments $M_1$ (FIG. 12) and $M_2$ (FIG. 13) to act on the slider. The angular moment $M_1$ acts horizontally about the locater pin 101, and the angular moment $M_2$ acts vertically about the step 101a in the bottom surface of the slider 21b. As a result of the moment $M_2$, the ball 103 is firmly pushed against the underlying surface 115a of the shelf-like projection 115 in the direction indicated by the arrow Y (FIG. 13). Further, by reason of the moment $M_1$, the relatively short guide pin 100 depending from the bottom of the slider 21b is pressed, in the direction of the arrow X (FIG. 12) against one side 99a of the respective guide groove 99. Moreover, reaction forces $F_2$ and $F_3$ are generated at the driving pin 29b and at the engagement of the contacts 107 and 120 and act in the same directions as the moments $M_1$ and $M_2$ with the result that the slider 21b can be smoothly and precisely disposed in its loaded position.

Since the contacts 107 and 120 have a very short relative sliding or wiping distance $\Delta L$ when they are put into engagement with each other, faulty contact or increased contact resistance is avoided while minimizing the wear of the contacts 107 and 120. As a result, the durability of the contacts 107 and 120 is enhanced significantly. The angle $\Theta_3$ at which the connector boards 105 and 117, and hence the contacts 107 and 120 are inclined can be varied, if desired, from the angle of 10° given above by way of example.

The reaction forces $F_2$ and $F_3$ resulting from the mutual engagement of the contacts 107 and 120 are in no way opposed to the positioning force of the locater pin 101 moving in the approximately V-shaped groove 116. Thus, the slider 21b is placed into its loading position with high precision, both in the horizontal and vertical directions, by use of the driving force $F_1$, the reaction forces $F_2$ and $F_3$ and the angular moments $M_1$ and $M_2$.

Since the contacts 107 and 120 are situated at the side portions of the end surfaces 104 and 119 which extend away from the drum 14 when the respective slider 21b is at its loaded position, the connector boards carrying the contacts are at the side of the shelf-like projection 115 and the locater pin 101 facing away from the drum 14 with the result that the switch contacts 107 and 120 and their respective connector boards can be easily replaced when necessary.

Although the structure and operation of the tape guiding device 20b and the arrangements provided for supplying power to its vibrated tape guide 25b and for precisely locating the slider 21b in the loaded position have been described in detail above with reference to FIGS. 12-15, it will be appreciated that the tape guiding device 20a is similarly constructed and operates in the same manner.

Although preferred embodiments of the invention have been described in detail herein with reference to the drawings, it is to be understood that the invention is not limited to those precise embodiments, and that various changes and modifications may be effected therein by one skilled in the art without departing from the scope or spirit of the invention as defined in the accompanying claims.

What is claimed is:

1. A tape recording and/or reproducing apparatus comprising:
   a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position; and
   a tape-guiding assembly including first and second ultrasonically vibrated tape guides engageable by the tape adjacent said tape-entry and tape-exit positions, respectively, first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, said first vibrated tape guide and first auxiliary guide element are mounted on a first slider and said second vibrated tape guide and second auxiliary guide element are mounted on a second slider, and said first and second sliders are mounted for movement between unloaded and loaded positions, and means for tensioning the tape so that said surface projections on said auxiliary guide elements relatively increase tension in the tape at said widthwise portions for minimizing error that may arise in the signals recorded or reproduced in said tracks adjacent said tape-entry and tape-exit positions due to vibrations transmitted along the tape from said vibrated tape guides; and further comprising main loading means for moving said sliders from said unloaded positions to said loaded positions which includes stopper means fixed at each of said loaded positions for determining the position of the respective slider in said loaded position; and mutually engaging contact means on each of said sliders and on the respective one of said stopper means which are inclined upwardly and forwardly, in the direction of said movement, from a perpendicular orientation to the plane of said movement, for supplying energizing power to said vibrated tape guide on the respective slider when the latter is disposed at said loaded position thereof.

2. A tape recording and/or reproducing apparatus according to claim 1; in which said auxiliary guide elements have elongated cylindrical surfaces with said surface projections being constituted by enlarged diameter portions thereof.

3. A tape recording and/or reproducing apparatus according to claim 1; in which said vibrated tape guides and said auxiliary guide elements have respective longitudinal axes extending perpendicular to the longitudinal direction of the tape and perpendicular to the plane of said planar orbit of said rotary head means, respectively.

4. A tape recording and/or reproducing apparatus according to claim 3; further comprising supply and take-up reel bases rotatable about axes parallel to said longitudinal axes of the vibrated tape guides for supporting supply and take-up reels, respectively, at the same level, and from which the tape is withdrawn to be wrapped about said guide drum; and in which said guide drum has a tilted central axis to which said longitudinal axes of the auxiliary guide elements are parallel.

5. A tape recording and/or reproducing apparatus according to claim 1; in which each of said vibrated tape guides includes a support shaft, a cylindrical bushing slidable on the support shaft and having a plurality of bearing rings spaced apart in the axial direction on the outer surface of said bushing, with at least said bearing rings being of a shock-absorbing material, a tubular tape guide diametrically dimensioned to extend telescopically over said bushing and be supported, at the inner surface of the tubular tape guide, by said bearing rings, and ultrasonic vibration generating means fixed to said tubular tape guide at a side of the latter and being operative to generate an ultrasonic standing wave oscillation in said tubular tape guide with nodes thereof substantially at said bearing rings.

6. A tape recording and/or reproducing apparatus according to claim 5; in which said shock-absorbing material is a polycarbonate resin.

7. A tape recording and/or reproducing apparatus according to claim 5; in which said bearing rings and said bushing are formed integrally of said shock-absorbing material.

8. A tape recording and/or reproducing apparatus according to claim 5; in which each of said vibrated tape guides further includes a base from which said support shaft extends upwardly, a threaded upper end portion on said support shaft, upper and lower flanges extending around said support shaft at opposite ends of said bushing and projecting beyond the outer surface of said tubular tape guide, spring means about said support shaft between said base and said lower flange, and a nut engaged with said threaded upper end portion of the support shaft and being adjustable for displacing said flanges, bushing and tubular tape guide, as a unit along said support shaft against the yieldable resistance of said spring means.

9. A tape recording and/or reproducing apparatus according to claim 1; in which said tape extends between supply and take-up reels in a cassette, and wherein in said unloaded positions, said vibrated tape guides and auxiliary guide elements are engageable with the tape in said cassette, and in said loaded positions, said first vibrated tape guide and auxiliary guide element and said second vibrated tape guide and auxiliary guide element are disposed adjacent said tape-entry and tape-exit positions, respectively, and wherein said main loading means moves said sliders from said unloaded positions to said loaded positions so that said vibrated tape guides and auxiliary guide elements withdraw the tape from the cassette and wrap the tape about the circumferential surface of the guide drum between said tape-entry and tape-exit positions.

10. A tape recording and/or reproducing apparatus according to claim 9; in which said means for tensioning the tape includes at least one auxiliary loading guide element; and further comprising a support arm carrying said auxiliary loading guide element adjacent one end of said support arm and being mounted for angular movements about a pivot axis adjacent the other end of the support arm between an unloaded position in which said auxiliary loading guide element is engageable with the tape in the cassette and a loaded position in which said auxiliary loading guide element also withdraws tape from the cassette and forms, in the withdrawn tape, a bight directed laterally away from said guide drum between the cassette and said loaded position of the first vibrated tape guide, a driving arm connected with said main loading means to be driven thereby, a pair of pivotally connected links extending between said driving arm and said support arm and being relatively angularly movable between an extended condition and a contracted condition, and limiter spring means urging said links to said extended condition for moving said support arm to said loaded position thereof when said main loading means move said sliders to said loaded positions of the latter, said links being moved to said contracted condition against the force of said limiter spring means when the tape tension in said bight exceeds a predetermined value, whereupon, said support arm is free to move substantially toward said unloaded position thereof for relieving the excess tension in the tape.

11. A tape recording and/or reproducing apparatus according to claim 9; in which said main loading means includes guide rails having surfaces on which said first and second sliders are respectively slidable between said unloaded and loaded positions and, said mutually engageable contact means being disposed at an end surface of said respective slider and a surface of the respective stopper means which comes into abutting relation therewith in response to movement of said respective slider to said loaded position thereof and which are inclined upwardly and forwardly, in the direction of said movement, from a perpendicular orientation to said surface of the respective guide rail.

12. A tape recording and/or reproducing apparatus according to claim 11; in which said contact means on each said stopper means includes contact pins projecting at right angles from said surface of the stopper means and being depressed during a final increment of movement of the respective slider to said loaded position thereof so as to provide a wiping action of said mutually engageable contact means on each other.

13. A tape recording and/or reproducing apparatus according to claim 11; in which each said stopper means includes a shelf-like projection extending over a portion of the respective slider adjacent said end of the latter, and each said slider has a ball embedded in an upwardly facing surface of said portion thereof to bear against said shelf-like projection and thereby limit the urging of said end of the slider away from the guide rail surface.

14. A tape recording and/or reproducing apparatus according to claim 13; in which said shelf-like projection of each stopper means has a notch in an edge thereof, each said slider has a laterally centered locater pin directed upwardly from said portion thereof and engaging in said notch as the respective slider nears said loaded position thereof, each said guide rail has a guide slot extending therethrough for passage of a drive pin which depends from the respective slider and, below the latter, is acted upon by said main loading means for moving the respective slider, and each said guide rail further has a guide groove slidably receiving a guide pin depending from the respective slider, said drive pin and guide pin being spaced apart laterally at opposite sides of central portion of the respective slider and being spaced from said locater pin in the direction away from said end surface of the respective slider.

15. A tape recording and/or reproducing apparatus according to claim 13; in which each said slider has an undercut lower surface portion adjacent an end of the respective slider remote from said end surface for defining a step about which the respective slider can be rocked for moving said embedded ball against the shelf-like projection.

16. A tape recording and/or reproducing apparatus according to claim 13; in which said contact means on each of said first and second sliders is at an end portion of said end surface which is laterally away from said guide drum, and said contact means on each of said stopper means is at a side of the respective shelf-like projection facing away from said guide drum.

17. In a tape recording and/or reproducing apparatus; a tape loading device including an ultrasonically vibrated tape guide, a slider having said vibrated tape guide mounted thereon, a guide rail having a surface on which said slider is movable from an unloaded position to a loaded position at which said vibrated tape guide operatively positions a tape engaged therewith, stopper means fixed at said loaded position for determining the position of said slider thereat, first and second contact means on an end surface of said slider which faces toward said stopper means in moving toward said loaded position and on a surface of said stopper means which confronts said end surface of the slider as the latter moves toward said loaded position, said first and second contact means being mutually engageable in said loaded position of the slider for supplying energizing power to said vibrated tape guide, said end surface of the slider and said surface of the stopper means which confronts the same being inclined upwardly and forwardly, in the direction of the movement of the slider to said loaded position, from a perpendicular to said surface of the guide rail and said second contact means including contact pins yieldably urged to project at right angles from said surface of the stopper means, and being depressed during a final increment of movement of said slider to its loaded position, so as to provide a wiping action of said first and second contact means in respect to each other.

18. A tape recording and/or reproducing apparatus according to claim 14; in which said stopper means has a shelf-like projection which extends over a portion of said slider adjacent said end of the latter as the slider nears said loaded position, and a ball is embedded in an upper surface of said portion of the slider to bear from below against said shelf-like projection in limiting movement of said end surface of the slider away from said surface of the guide rail.

19. A tape recording and/or reproducing apparatus according to claim 18; in which said shelf-like projection has a notch in an edge thereof, said slider has an upstanding locater pin substantially laterally centered therein at a position spaced from said ball in the direction away from said end surface for engaging in said notch as said slider nears said loaded position, said guide rail has a guide slot extending therethrough and a parallel guide groove in said surface and being laterally spaced from said guide slot, a drive pin depends from said slider at one side of a central portion of the slider and passes through said guide slot, and a guide pin depends from said slider at the other side of said central portion and is slidable in said guide groove; and further comprising loading means engageable with said drive pin below said guide rail for effecting said movement of the slider toward said loaded position.

20. A tape recording and/or reproducing apparatus according to claim 17; in which said slider has an undercut lower surface portion adjacent an end thereof remote from said end surface of the slider for defining a step about which said slider is rockable to the extent permitted by engagement of said ball with said shelf-life projection.

21. A tape recording and/or reproducing apparatus comprising:
a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position;
a tape-guiding assembly including:
first and second ultrasonically vibrated tape guides engageable by the tape adjacent said tape-entry and tape-exit positions, respectively, each of said vibrated tape guides includes a support shaft, a cylindrical bushing slidable on the support shaft which has a plurality of bearing rings spaced apart in the axial direction on the outer surface of said bushing, with at least said bearing rings being of a shock-absorbing material, a tubular tape guide diametrically dimensioned to extend telescopically over said bushing and be supported, at the inner surface of the tubular tape guide, by said bearing rings, and ultrasonic vibration generating means fixed to said tubular tape guide at a side of the latter and being operative to generate an ultrasonic standing wave oscillation in said tubular tape guide with nodes thereof substantially at said bearing rings, a base from which said support shaft extends upwardly, a threaded upper end portion on said support shaft, upper and lower flanges extending around said support shaft at opposite ends of said bushing and projecting beyond the outer surface of said tubular tape guide, spring means about said support shaft between said base and said lower flange, a nut engaged with said threaded upper end portion of the support shaft and being adjustable for displacing said flanges, bushing and tubular tape guide, as a unit along said support shaft against the yieldable resistance of said spring means, a head on said nut and a spacer between said head and said upper flange, said head having a circular rib depending from a lower face thereof, and said spacer having a part-circular arcuate slot receiving a portion of said circular rib so that said upper flange is canted relative to the axis of said shaft,
first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, and means for tensioning the tape so that said surface projections on said auxiliary guide elements relatively increase tension in the tape at said widthwise portions for minimizing errors that may arise in the signals recorded or reproduced in said tracks adjacent said tape-entry and tape-exit positions due to vibrations transmitted along the tape from said vibrated tape guides.

22. A tape recording and/or reproducing apparatus comprising:

a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position, said tape extending between supply and take-up reels in a cassette, a tape-guiding assembly including:

first and second ultrasonically vibrated tape guides engageable by the tape adjacent said tape-entry and tape-exit positions, respectively, first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, said first vibrated tape guide and first auxiliary guide element are mounted on a first slider and said second vibrated tape guide and second auxiliary guide element are mounted on a second slider, and said first and second sliders are mounted for movements between unloaded positions, in which said vibrated tape guides and auxiliary guide elements are engageable with the tape in said cassette, and loaded positions, in which said first vibrated tape guide and auxiliary guide element and said second vibrated tape guide and auxiliary guide element are disposed adjacent said tape-entry and tape-exit positions, respectively;

main loading means for moving said sliders from said unloaded positions to said loaded positions so that said vibrated tape guides and auxiliary guide elements withdraw the tape from the cassette and wrap the tape about the circumferential surface of the guide drum between said tape-entry and tape-exit positions, and means for tensioning the tape so that said surface projections on said auxiliary guide elements relatively increase tension in the tape at said widthwise portions for minimizing errors that may arise in the signals recorded or reproduced in said tracks adjacent said tape-entry and tape-exit positions due to vibrations transmitted along the tape from said vibrated tape guides, said means for tensioning the tape including at least one auxiliary loading guide element; and further comprising a support arm carrying said auxiliary loading guide element adjacent one end of said support arm and being mounted for angular movements about a pivot axis adjacent the other end of the support arm between an unloaded position in which said auxiliary loading guide element is engageable with the tape in the cassette and a loaded position in which said auxiliary loading guide element also withdraws tape from the cassette and forms, in the withdrawn tape, a bight directed laterally away from said guide drum between the cassette and said loaded position of the first vibrated tape guide, a driving arm connection with said main loading means to be driven thereby, a pair of pivotally connected links extending between said driving arm and said support arm and being relatively angularly movable between an extended condition and a contracted condition, and limiter spring means urging said links to said extended condition for moving said support arm to said loaded position thereof when said main loading means move said sliders to said loaded positions of the latter, said links being moved to said contracted condition against the force of said limiter spring means when the tape tension in said bight exceeds a predetermined value, whereupon, said support arm is free to move substantially toward said unloaded position thereof for relieving the excess tension in the tape, and said main loading means including counter-rotatable first and second drive rings extending around said guide drum, first and second guide rails along which said first and second sliders are movable between said unloaded and loaded positions thereof, and drive links pivotally connected between said first and second drive rings and said first and second sliders, respectively; and gear transmission means for angularly turning said driving arm in response to turning of one of said drive rings and having torque limiting means interposed therein.

23. A tape recording and/or reproducing apparatus comprising:

a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position, said tape extending between supply and take-up reels in a cassette;

a tape-guiding assembly including:

first and second ultrasonically vibrated tape guides engageable by the tape adjacent said tape-entry and tape-exit positions, respectively, first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, said first vibrated tape guide and first auxiliary guide element are mounted on a first slider and said second vibrated tape guide and second auxiliary guide element are mounted on a second slider, and said first and second sliders are mounted for movements between unloaded positions, in which said vibrated tape guides and auxiliary guide elements are engageable with the tape in said cassette, and loaded positions, in which said first vibrated tape guide and auxiliary guide element and said second vibrated tape guide and auxiliary guide element are disposed adjacent said tape-entry and tape-exit positions, respectively;

means for tensioning the tape so that said surface projections on said auxiliary guide elements relatively increase tension in the tape at said widthwise portions for minimizing errors that may arise in the signals recorded or reproduced in said tracks adjacent said tape-entry and tape-exit positions due to vibrations transmitted along the tape from said vibrated tape guides, main loading means for moving said sliders from said unloaded positions to said loaded positions so that said vibrated tape guides and auxiliary guide elements withdraw the tape from the cassette and wrap the tape about the circumferential surface of the guide drum between said tape-entry and tape-exit positions, said main loading means including guide rails having surfaces on which said first and second sliders are respectively slidable between said unloaded and loaded positions, and stopper means fixed at each of said loaded positions for determining the position of the respective slider in said loaded position; and further comprising mutually engageable contact means on each of said sliders and on the respective one of said stopper means for supplying energizing power to said vibrated tape guide on the respective slider when the latter is disposed at said loaded position thereof, said mutually engageable contact means being disposed at an end surface of said respective slider and a surface of the respective stopper means which comes into abutting relation therewith in response to movement of said respective slider to said loaded position thereof and which are inclined upwardly and forwardly, in the direction of said movement, from a perpendicular orientation to said surface of the respective guide rail.

24. A tape recording and/or reproducing apparatus according to claim 23; in which said contact means on each said stopper means includes contact pins projecting at right angles from said surface of the stopper means and being depressed during a final increment of movement of the respective slider to said loaded position thereof so as to provide a wiping action of said mutually engageable contact means on each other.

25. A tape recording and/or reproducing apparatus according to claim 23; in which each said stopper means includes a shelf-like projection extending over a portion of the respective slider adjacent said end of the latter, and each said slider has a ball embedded in an upwardly facing surface of said portion thereof to bear against said shelf-like projection and thereby limit the urging of said end of the slider away from the guide rail surface.

26. A tape recording and/or reproducing apparatus according to claim 25; in which said shelf-like projection of each stopper means has a notch in an edge thereof, each said slider has a laterally centered locater pin directed upwardly from said portion thereof and engaging in said notch as the respective slider nears said loaded position thereof, each said guide rail has a guide slot extending therethrough for passage of a drive pin which depends from the respective slider and, below the latter, is acted upon by said main loading means for moving the respective slider, and each said guide rail further has a guide groove slidably receiving a guide pin depending from the respective slider, said drive pin and guide pin being spaced apart laterally at opposite sides of a central portion of the respective slider and being spaced from said locater pin in the direction away from said end surface of the respective slider.

27. A tape recording and/or reproducing apparatus according to claim 25; in which each said slider has an undercut lower surface portion adjacent an end of the respective slider remote from said end surface for defining a step about which the respective slider can be rocked for moving said embedded ball against the shelf-like projection.

28. A tape recording and/or reproducing apparatus according to claim 25; in which said contact means on each of said first and second sliders is at an end portion of said end surface which is laterally away from said guide drum, and said contact means on each of said stopper means is at a side of the respective shelf-like projection facing away from said guide drum.

29. A tape recording and/or reproducing apparatus comprising:

a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position;

a tape-guiding assembly including:

first and second ultrasonically vibrated tape guides engageable by the tape adjacent said tape-entry and tape-exit positions, respectively, each of said vibrated tape guides includes a support shaft, a cylindrical bushing slidable on the support shaft which has a plurality of bearing rings spaced apart in the axial direction on the outer surface of said bushing, with at least said bearing rings being of a shock-absorbing material, a tubular tape guide diametrically dimensioned to extend telescopically over said bushing and be supported, at the inner surface of the tubular tape guide, by said bearing rings, and ultrasonic vibration generating means fixed to said tubular tape guide at a side of the latter and being operative to generate an ultrasonic standing wave oscillation in said tubular tape guide with nodes thereof substantially at said bearing rings, a base from which said support shaft extends upwardly, a threaded upper end portion on said support shaft, upper and lower flanges extending around said support shaft at opposite ends of said bushing and projecting beyond the outer surface of said tubular tape guide, spring means about said support shaft between said base and said lower flange, a nut engaged with said threaded upper end portion of the support shaft and being adjustable for displacing said flanges, bushing and tubular tape guide, as a unit along said support shaft against the yieldable resistance of said spring means, a head on said nut and a spacer between said head and said upper flange, said head having a circular rib depending from a lower face thereof, and said spacer having a part-circular arcuate slot receiving a portion of said circular rib so that said upper flange is canted relative to the axis of said shaft, first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, said first vibrated tape guide and first auxiliary guide element are mounted on first slider and said second vibrated tape guide and second auxiliary guide element are mounted on a second slider, and said first and second sliders are mounted for movement between unloaded and loaded positions, and means for tensioning the tape so that said surface projections on said auxiliary guide elements relatively increase tension in the tape at said widthwise portions for minimizing errors that may arise in the signals recorded or reproduced in said tracks adjacent said tape-entry and tape-exit positions due to vibrations transmitted along the tape from said vibrated tape guides; and further comprising main loading means for moving said sliders from said unloaded position to said loaded position which includes stopper means fixed at each of said loaded positions for determining the position of the respective slider in said loaded position.

30. A tape recording and/or reproducing apparatus comprising:

a guide drum with rotary head means thereon moving in a planar orbit coinciding with a circumferential surface of the drum for recording or reproducing signals in slant tracks scanned on a longitudinally transported tape wrapped helically about said circumferential surface between a tape-entry position and a tape-exit position, said tape extending between supply and take-up reels in a cassette, a tape-guiding assembly including:

first and second ultrasonically vibrated tape guides engageable by the tape adjacent said tape-entry and tape-exit positions, respectively, first and second auxiliary guide elements angled relative to said first and second vibrated tape guides, respectively, and being disposed for engagement by the tape between said first vibrated tape guide and said tape-entry position and between said second vibrated tape guide and said tape-exit position, respectively, said first and second auxiliary guide elements having respective surface projections extending therefrom at positions therealong corresponding to widthwise portions of the tape at which said rotary head means scan the tape adjacent said tape-entry and tape-exit positions, respectively, said first vibrated tape guide and first auxiliary guide element are mounted on a first slider and said second vibrated tape guide and second auxiliary guide element are mounted on a second slider, and said first and second sliders are mounted for movement between unloaded and loaded positions, and wherein in said unloaded position, said vibrated tape guides and auxiliary guide elements are engageable with the tape in said cassette, and in said loaded position, said first vibrated tape guide and auxiliary guide element and said second vibrated tape guide and auxiliary guide element are disposed adjacent said tape-entry and tape-exit positions, respectively;

main loading means moving said sliders from said unloaded positions to said loaded positions so that said vibrated tape guides and auxiliary guide elements withdraw the tape from the cassette and wrap the tape about the circumferential surface of the guide drum between said tape-entry and tape-exit positions, said main loading means including stopper means fixed at each of said loaded positions for determining the position of the respective slider in said loaded position, and means for tensioning the tape so that said surface projections on said auxiliary guide elements relatively increase tension in the tape at said widthwise portions for minimizing errors that may arise in the signals recorded or reproduced in said tracks adjacent said tape-entry and tape-exit positions due to vibrations transmitted along the tape from said vibrated tape guides, said means for tensioning the tape including at least one auxiliary loading guide element; and further comprising a support arm carrying said auxiliary loading guide element adjacent one end of said support arm and being mounted for angular movements about a pivot axis adjacent the other end of the support arm between an unloaded position in which said auxiliary loading guide element is engageable with the tape in the cassette and a loaded position in which said auxiliary loading guide element also withdraws tape from the cassette and forms, in the withdrawn tape, a bight directed laterally away from said guide drum between the cassette and said loaded position of the first vibrated tape guide, a driving arm connected with said main loading means to be driven thereby, a pair of pivotally connected links extending between said driving arm and said support arm and being relatively angularly movable between an extended condition and a contracted condition, and limiter spring means urging said links to said extended condition for moving said support arm to said loaded position thereof when said main loading means move said sliders to said loaded positions of the latter, said links being moved to said contracted condition against the force of said limiter spring means when the tape tension in said bight exceeds a predetermined value, whereupon, said support arm is free to move substantially toward said unloaded position thereof for relieving the excess tension in the tape, and said main loading means including counter-rotatable first and second drive rings extending around said guide drum, first and second guide rails along which said first and second sliders are movable between said unloaded and loaded positions thereof, and drive links pivotally connected between said first and second drive rings and said first and second sliders, respectively; and gear transmission means for angularly turning said driving arm in response to turning of one of said drive rings and having torque limiting means interposed therein.

* * * * *